US011770175B2

(12) United States Patent
Dai et al.

(10) Patent No.: US 11,770,175 B2
(45) Date of Patent: Sep. 26, 2023

(54) RECONFIGURABLE INTELLIGENT SURFACE DISCOVERY PROCEDURES

(71) Applicant: QUALCOMM Incorporated, San Diego, CA (US)

(72) Inventors: Yucheng Dai, San Diego, CA (US); Wooseok Nam, San Diego, CA (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 17/186,992

(22) Filed: Feb. 26, 2021

(65) Prior Publication Data

US 2022/0278738 A1 Sep. 1, 2022

(51) Int. Cl.
*H04B 7/145* (2006.01)
*H04B 7/155* (2006.01)
*H04W 8/00* (2009.01)
*H04W 48/12* (2009.01)
*H04W 88/08* (2009.01)

(52) U.S. Cl.
CPC ......... *H04B 7/145* (2013.01); *H04B 7/15507* (2013.01); *H04W 8/005* (2013.01); *H04W 48/12* (2013.01); *H04W 88/085* (2013.01)

(58) Field of Classification Search
CPC .. H04B 7/145; H04B 7/15507; H04B 7/0695; H04W 8/005; H04W 48/12; H04W 88/085
USPC ........................................................ 370/315
See application file for complete search history.

(56) References Cited

U.S. PATENT DOCUMENTS

| 2021/0013619 A1 | 1/2021 | Alkhateeb et al. | |
| 2022/0014935 A1* | 1/2022 | Haija | H04B 17/336 |
| 2022/0052764 A1* | 2/2022 | Medra | H04L 27/38 |

FOREIGN PATENT DOCUMENTS

| CN | 111245494 A | | 6/2020 | |
| CN | 114448586 A | * | 5/2022 | |
| WO | WO-2021236510 A1 | * | 11/2021 | H04B 7/026 |

OTHER PUBLICATIONS

International Search Report and Written Opinion—PCT/US2021/065371—ISA/EPO—dated May 3, 2022.

* cited by examiner

*Primary Examiner* — Rownak Islam
(74) *Attorney, Agent, or Firm* — Holland & Hart LLP

(57) ABSTRACT

Methods, systems, and devices for wireless communications are described. In an example, a method for wireless communication at a first user equipment (UE) in a wireless communications system is described, including receiving, from a base station, information associated with one or more reconfigurable intelligent surfaces (RISs) in the wireless communications system. The method may also include transmitting a sensing signal to the one or more RISs based at least in part on the information and transmitting an uplink wireless communication to the base station or a second UE using the one or more RISs based at least in part on the sensing. Another method includes determining information associated with one or more RISs in the wireless communications system, transmitting, to a UE, the information associated with the RISs, and communicating with the UE via the RISs based at least in part on the information associated with the RISs.

27 Claims, 16 Drawing Sheets

RECONFIGURABLE INTELLIGENT SURFACE DISCOVERY PROCEDURES

FIELD OF TECHNOLOGY

The following relates to wireless communications, including reconfigurable intelligent surface discovery procedure based on wireless sensing.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, base stations and UEs may communicate using a reconfigurable intelligent surface (RIS). An RIS may use passive or nearly passive components to redirect (e.g., reflect, refract) incoming signals in one or more directions without utilizing a significant power overhead. For example, the RIS may use configurable materials to redirect a signal in a specific direction (e.g., instead of using a power amplifier to amplify and re-transmit the signal). However, an RIS may not be transparent to all nodes in a wireless communications network.

SUMMARY

The described techniques relate to improved methods, systems, devices, and apparatuses that support reconfigurable intelligent surface discovery procedure based on wireless sensing. Generally, the described techniques provide for a UE to obtain RIS information and use that information for RIS-assisted communications.

In some aspects, the UE may communicate with a base station to receive RIS information regarding one or more RISs in a coverage area. The UE may request the RIS information or the base station may send the RIS information without a request. The UE may use the RIS information to locate the one or more RISs by sweeping a signal around the possible locations of the RIS. The UE may use various techniques to distinguish the RIS from other environmental objects based on return signals received at the UE. Once the RIS is discovered and located, the UE may use the one or more RISs to communicate with the base station or another UE. In some examples, the UE may send an RIS control message if the RIS is controllable.

A method for wireless communication at a first user equipment (UE) in a wireless communications system is described. The method may include receiving, from a base station, information associated with one or more RISs in the wireless communications system, transmitting a sensing signal to the one or more RISs based on the information, and transmitting an uplink wireless communication to the base station or a second UE using the one or more RISs based on the sensing.

An apparatus for wireless communication at a first UE in a wireless communications system is described. The apparatus may include a processor, memory coupled with the processor, and instructions stored in the memory. The instructions may be executable by the processor to cause the apparatus to receive, from a base station, information associated with one or more RISs in the wireless communications system, transmit a sensing signal to the one or more RISs based on the information, and transmit an uplink wireless communication to the base station or a second UE using the one or more RISs based on the sensing.

Another apparatus for wireless communication at a first UE in a wireless communications system is described. The apparatus may include means for receiving, from a base station, information associated with one or more RISs in the wireless communications system, means for transmitting a sensing signal to the one or more RISs based on the information, and means for transmitting an uplink wireless communication to the base station or a second UE using the one or more RISs based on the sensing.

A non-transitory computer-readable medium storing code for wireless communication at a first UE in a wireless communications system is described. The code may include instructions executable by a processor to receive, from a base station, information associated with one or more RISs in the wireless communications system, transmit a sensing signal to the one or more RISs based on the information, and transmit an uplink wireless communication to the base station or a second UE using the one or more RISs based on the sensing.

Some examples of the method, apparatuses, and non-transitory computer-readable medium described herein may further include operations, features, means, or instructions for requesting, from the base station, the information associated with the one or more RISs, where receiving the information may be based on the requesting.

In some examples of the method, apparatuses, and non-transitory computer-readable medium described herein, requesting the information may include operations, features, means, or instructions for transmitting a request via a radio resource control signal, a media access control (MAC) control element, a physical uplink control channel, or a physical random access channel.

In some examples of the method, apparatuses, and non-transitory computer-readable medium described herein, transmitting the sensing signal to the one or more RISs may include operations, features, means, or instructions for sweeping the sensing signal over a directional range and receiving a return signal related to the sensing signal that indicates a direction of a first RIS of the one or more RISs.

In some examples of the method, apparatuses, and non-transitory computer-readable medium described herein, the return signal related to the sensing signal includes a reflection of the sensing signal off the first RIS In some examples of the method, apparatuses, and non-transitory computer-readable medium described herein, the return signal related to the sensing signal includes a signal from the second UE based on the second UE detecting a reflection of the sensing signal from the first RIS.

Some examples of the method, apparatuses, and non-transitory computer-readable medium described herein may further include operations, features, means, or instructions for determining a property of the sensing signal based on the information associated with the one or more RISs.

Some examples of the method, apparatuses, and non-transitory computer-readable medium described herein may further include operations, features, means, or instructions for receiving one or more return signals related to the sensing signal that indicate a presence of a set of multiple objects and distinguishing the one or more RISs among the set of multiple objects based on the information associated with the one or more RISs.

Some examples of the method, apparatuses, and non-transitory computer-readable medium described herein may further include operations, features, means, or instructions for receiving an indication of resources to use for the sensing signal.

In some examples of the method, apparatuses, and non-transitory computer-readable medium described herein, the resources may include one or more of time or frequency resources, a sensing signal waveform, and peer-to-peer communication resources.

Some examples of the method, apparatuses, and non-transitory computer-readable medium described herein may further include operations, features, means, or instructions for transmitting an RIS control message to the first RIS.

Some examples of the method, apparatuses, and non-transitory computer-readable medium described herein may further include operations, features, means, or instructions for determining that a type of a first RIS of the one or more RISs may be a controllable RIS based on the information, where the RIS control message may be based on the type of the first RIS.

In some examples of the method, apparatuses, and non-transitory computer-readable medium described herein, transmitting the sensing signal may include operations, features, means, or instructions for transmitting the sensing signal to the first RIS at a first time after a delay period from a second time of transmitting the RIS control message.

Some examples of the method, apparatuses, and non-transitory computer-readable medium described herein may further include operations, features, means, or instructions for determining the delay period based on a configuration of the first UE or a configuration signal received at the first UE.

In some examples of the method, apparatuses, and non-transitory computer-readable medium described herein, the information associated with the one or more RISs includes at least one of a number of the one or more RISs, an operating frequency of a first RIS of the one or more RISs, a location of the first RIS, a type of the first RIS, a control protocol of the first RIS, a pattern of state change of the first RIS, and a current state of the first RIS.

A method for wireless communication at a base station in a wireless communications system is described. The method may include determining information associated with one or more RISs in the wireless communications system, transmitting, to a UE, the information associated with the one or more RISs, and communicating with the UE via the one or more RISs based on the information associated with the one or more RISs.

An apparatus for wireless communication at a base station in a wireless communications system is described. The apparatus may include a processor, memory coupled with the processor, and instructions stored in the memory. The instructions may be executable by the processor to cause the apparatus to determine information associated with one or more RISs in the wireless communications system, transmit, to a UE, the information associated with the one or more RISs, and communicate with the UE via the one or more RISs based on the information associated with the one or more RISs.

Another apparatus for wireless communication at a base station in a wireless communications system is described. The apparatus may include means for determining information associated with one or more RISs in the wireless communications system, means for transmitting, to a UE, the information associated with the one or more RISs, and means for communicating with the UE via the one or more RISs based on the information associated with the one or more RISs.

A non-transitory computer-readable medium storing code for wireless communication at a base station in a wireless communications system is described. The code may include instructions executable by a processor to determine information associated with one or more RISs in the wireless communications system, transmit, to a UE, the information associated with the one or more RISs, and communicate with the UE via the one or more RISs based on the information associated with the one or more RISs.

Some examples of the method, apparatuses, and non-transitory computer-readable medium described herein may further include operations, features, means, or instructions for receiving, from the UE, a request for the information associated with the one or more RISs, where transmitting the information associated with the one or more RISs may be based on the request.

In some examples of the method, apparatuses, and non-transitory computer-readable medium described herein, receiving the request may include operations, features, means, or instructions for receiving the request via a radio resource control signal, a MAC control element, a physical uplink control channel, or a physical random access channel.

Some examples of the method, apparatuses, and non-transitory computer-readable medium described herein may further include operations, features, means, or instructions for transmitting an indication of resources to the UE for sensing the one or more RISs.

In some examples of the method, apparatuses, and non-transitory computer-readable medium described herein, the resources may include one or more of time or frequency resources, a sensing signal waveform, and peer-to-peer communication resources.

Some examples of the method, apparatuses, and non-transitory computer-readable medium described herein may further include operations, features, means, or instructions for determining a delay period between a sensing signal and a control signal for the one or more RISs and transmitting an indication of the delay period to the UE.

In some examples of the method, apparatuses, and non-transitory computer-readable medium described herein, transmitting the information associated with the one or more RISs may include operations, features, means, or instructions for transmitting the information associated with the one or more RISs via system information, a radio resource control signal, a MAC control element, or a physical downlink control channel.

In some examples of the method, apparatuses, and non-transitory computer-readable medium described herein, the information associated with the one or more RISs includes at least one of a number of the one or more RISs, an operating frequency of a first RIS of the one or more RISs, a location of the first RIS, a type of the first RIS, a control protocol of the first RIS, a pattern of state change of the first RIS, and a current state of the first RIS.

DETAILED DESCRIPTION

Figure 1:
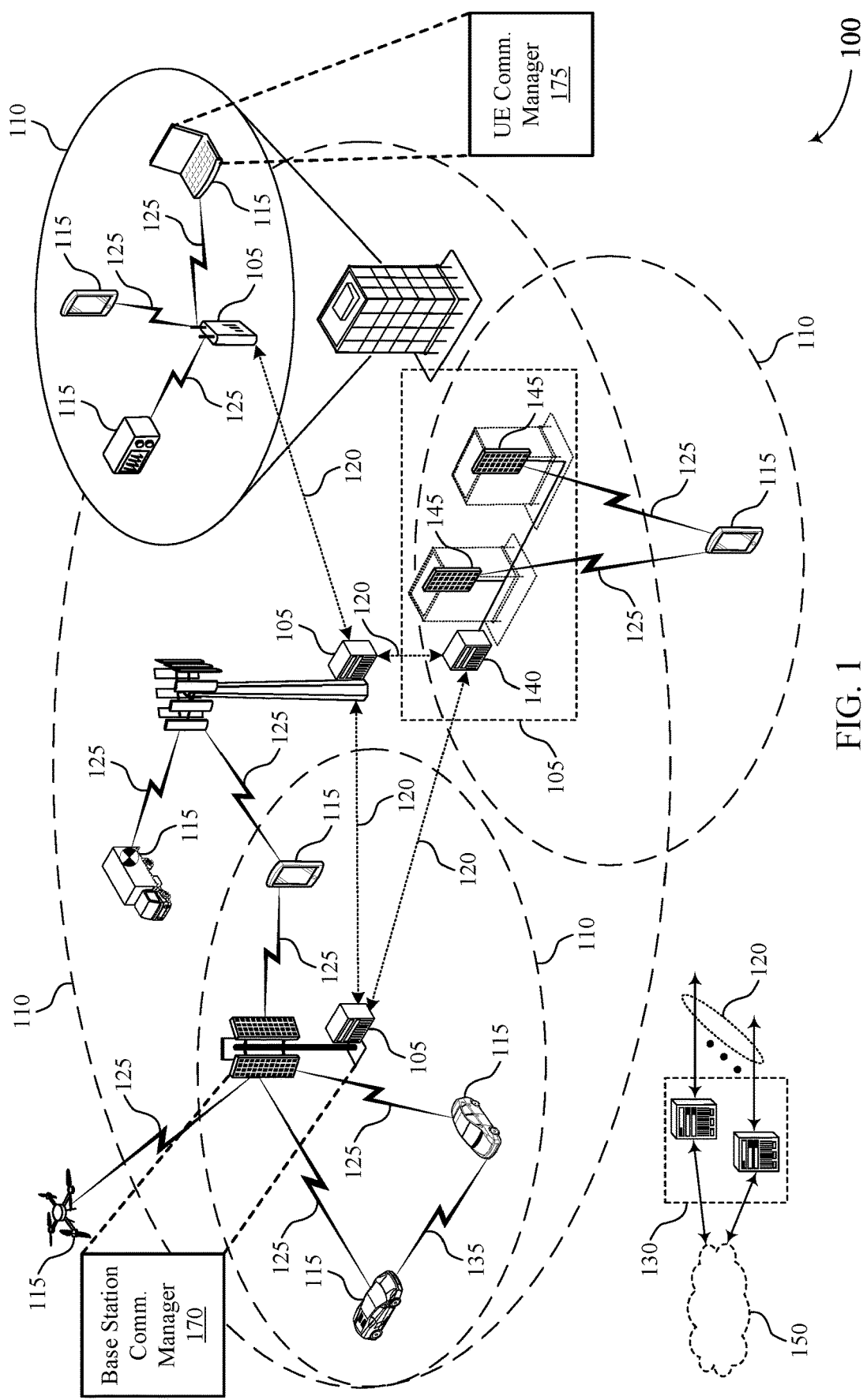
FIG. 1 illustrates an example of a wireless communications system that supports reconfigurable intelligent surface discovery procedures in accordance with aspects of the present disclosure.

Base stations and UEs in a wireless communications system may use beamforming techniques to communicate with each other by using spatial dimensions provided by an environment. However, in some cases, physical proximity or environmental factors (e.g., interference, blockage) may impair beamforming communications between the base stations the UEs. In some examples, the wireless communications system may employ a reconfigurable intelligent surface (RIS) that uses passive or nearly passive components to redirect (e.g., reflect, refract) incoming signals in one or more directions without utilizing a significant power overhead. For example, the RIS may use configurable materials to redirect a signal in a specific direction (e.g., instead of using a power amplifier to amplify and re-transmit the signal). As such, the RIS may increase cell coverage, spatial diversity, and beamforming gain, and may result in the base stations or UEs consuming less power.

In some aspects, the RIS may be dynamically configured to redirect an incoming signal in a specific direction. For example, a UE may configure the RIS to redirect a beamformed communication in a direction of a second UE based on a location of the second UE for sidelink communications. Similarly, the UE may transmit a beamformed communication in a direction of the RIS for redirection to the base station. That is, RISs can facilitate transmission between the base station and a UE or between two UEs for sidelink communications.

However, the presence of an RIS may be transparent to a UE. A UE may benefit from having information about the time-varying relative position of an RIS so that it can more effectively leverage the RIS for communications, such as sidelink communications. As used herein, sidelink communications may be communications between two UEs without use of an intervening base station. Sidelink communications may be reflected or refracted off an RIS.

Techniques described herein enable a UE to receive or determine RIS information about one or more RISs and use that RIS information to sense the one or more RISs. The UE may receive RIS information from the base station, which may include a number of the RISs, an operating frequency of an RIS, a location of the RIS, a redirection angle of the RIS, a type of the RIS, a control protocol of the RIS, a pattern of state change of the RIS, and a current state of the RIS. In some examples, the base station may transmit, to the UE (e.g., via an RIS), RIS information for multiple RISs in a coverage area of the base station. In some examples, the UE may request the RIS information. The RIS information may be transmitted to the UE via system information (SI), radio resource control (RRC) signaling, a downlink control information (DCI) or medium access control (MAC) control element (MAC-CE), among other control types signaling. An RIS may be configurable (type 1) or non-configurable (type 2).

The UE may use the RIS information to autonomously discover the one or more RISs. The UE may determine one or more properties for a signal used to sense the RISs based on the RIS information, such as a sensing duration, a periodicity, a waveform, bandwidth, and type information. The UE can be configured for dedicated resources to use for RIS discovery. The RIS discovery can be by mono-static sensing or bi-static sensing. For sensing controllable RISs, the UE may send an RIS control message a minimum time period before sending the sensing signal. The UE may also use the RIS information to distinguish between RIS objects and non-RIS objects in the environment.

A UE may support sending uplink communications directly to a base station or another UE, for example, over a communications link that is independent of RIS-assisted communications. The communications link independent of RIS-assisted communications may also be referred to herein as a direct communications link, a non RIS-based communications link, or a non RIS-assisted communications link. In some cases, the UE may support transmitting uplink communications indirectly to the base station or the other UE, for example, over a communications link that is associated with RIS-assisted communications. The communications link associated with RIS-assisted communications may also be referred to herein as an indirect communications link, an RIS-based communications link, or an RIS-assisted communications link).

Aspects of the disclosure are initially described in the context of wireless communications systems. Aspects of the disclosure are further illustrated by and described with reference to block diagrams, swim diagrams, and flowcharts. Aspects of the disclosure are further illustrated by and described with reference to apparatus diagrams, system diagrams, and flowcharts that relate to reconfigurable intelligent surface discovery procedure based on wireless sensing.

FIG. 1 illustrates an example of a wireless communications system 100 that supports reconfigurable intelligent surface discovery procedures in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

A base station 105 may include a base station communications manager 170. The base station communications manager 170 may employ techniques described herein to perform reconfigurable intelligent surface discovery procedures using wireless sensing. In some examples, the base station communications manager 170 may determine information associated with one or more reconfigurable intelligent surfaces in the wireless communications system. The base station communications manager 170 may transmit, to a UE 115, the information associated with the one or more reconfigurable intelligent surfaces. The base station communications manager 170 may communicate with the UE via the one or more reconfigurable intelligent surfaces based at least in part on the information associated with the one or more reconfigurable intelligent surfaces.

The base station communications manager 170 may improve reliability of communications, improve throughput, improve power savings at the UE 115, improve sidelink communications for the UE 115, and help to reduce interference with other devices.

A UE 115 may include a UE communications manager 175. The UE communications manager 175 may employ techniques described herein to perform reconfigurable intelligent surface discovery procedures using wireless sensing. In some examples, the UE communications manager 175 may receive, from a base station, information associated with one or more RISs in the wireless communications system. The UE communications manager 175 may transmit a sensing signal to the one or more RISs based at least in part on the information. The UE communications manager 175 may transmit an uplink wireless communication to the base station or a second UE using the one or more RISs based at least in part on the sensing.

The UE communications manager 175 may improve reliability of communications, improve sidelink communications, improve battery life at the UE 115, improve power savings at the UE, improve throughput, and reduce interference with other devices.

Figure 2:
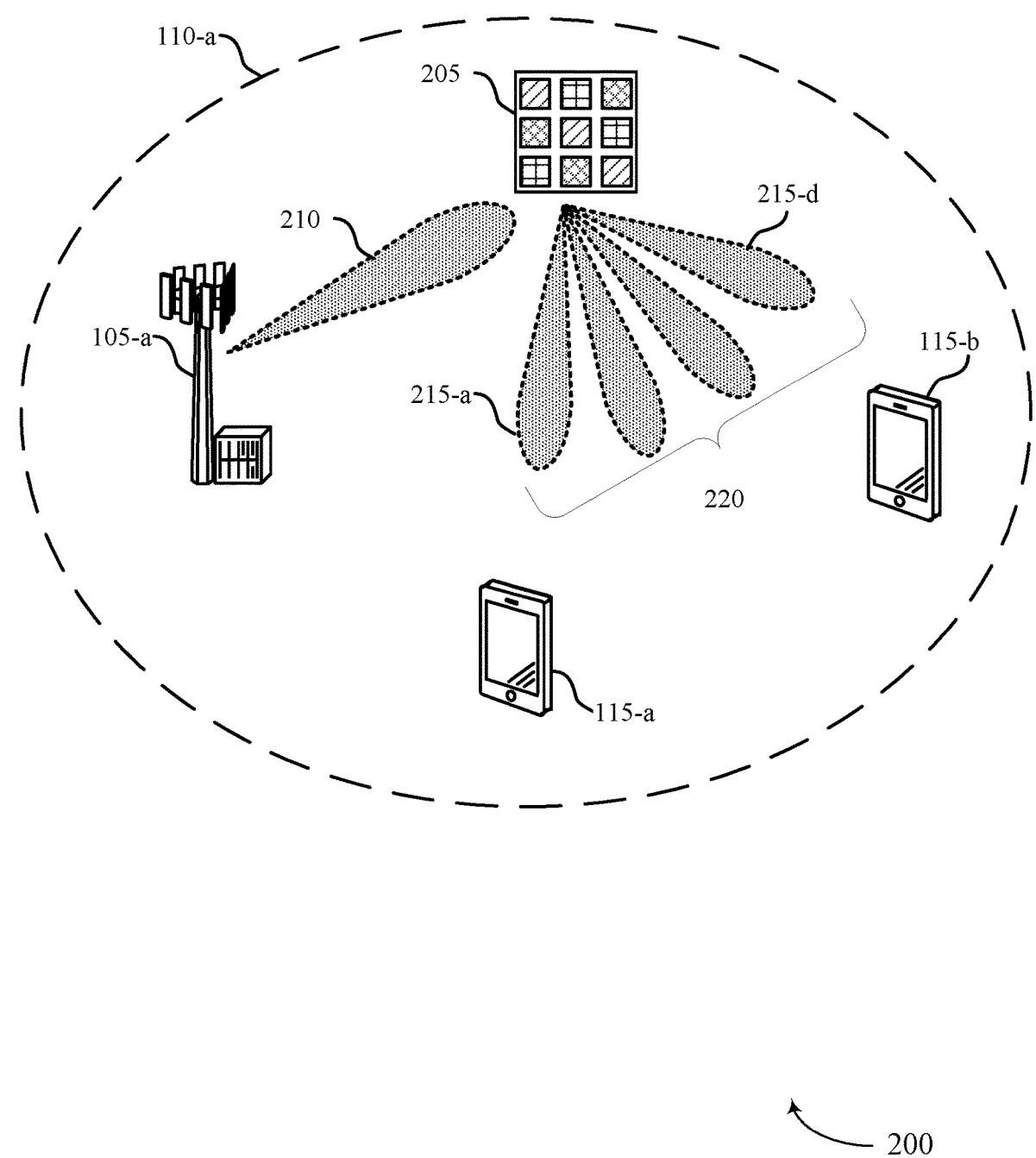
FIG. 2 illustrates an example of a wireless communications system that supports reconfigurable intelligent surface discovery procedures in accordance with aspects of the present disclosure.

FIG. 2 illustrates an example of a wireless communications system 200 that supports reconfigurable intelligent surface discovery procedures in accordance with aspects of the present disclosure. In some examples, wireless communications system 200 may implement aspects of wireless communications system 100. For example, the wireless communications system 200 may include a UE 115-a, a UE 115-b, and a base station 105-a, which may be examples of corresponding devices described herein with reference to FIG. 1. In some cases, wireless communications system 200 may support detection of RISs using wireless sensing and support transmissions via the RISs.

In some aspects, the UE 115-a, the UE 115-b, and the base station 105-a may communicate within a geographic coverage area 110-a of the base station 105-a via a communications link 210. In some examples, the communications link 210 may be an RIS-based communications link. In an example, the UE 115-a and the base station 105-a may use an RIS 205 to communicate via a communications link 210. In some cases, the UE 115-a and the base station 105-a may use multiple RISs 205 to communicate via the communications link 210. In other examples, the communications link 210 may be a non RIS-based communications link. In an example, the UE 115-b and the base station 105-a may communicate via the communications link 210, independent of the RIS 205 (or independent of any number of RISs 205). The RIS 205 may have a wired connection or a wireless connection with the base station 105-a and may be located anywhere in the coverage area 110-a of the base station 105-a.

The RIS 205 may be a controllable device that is designed to reflect signals from wireless devices to enhance communications. The RIS 205 may include a number of nearly uniformly distributed electrically controllable elements. Each element of the RIS 205 may have reconfigurable electromagnetic characteristics, such as a reflection coefficient. Depending on the combination of the configured states of the elements, the RIS 205 can reflect and modify an incident radio waveform in a controlled manner. For example, the RIS 205 can change the reflected direction, the beam width, or the like.

For example, the RIS 205 may be a near passive device that redirects incoming signals in a specific direction according to a configuration of the RIS 205. The RIS 205 may include any combination of reflective and refractive surfaces configured to redirect signals between the base station 105-a, the UE 115-a, and the UE 115-b (e.g., rather than using active components to amplify and re-transmit the signals). For example, the RIS 205 may use one or more passive or near passive components to redirect signals between the UE 115-a and the UE 115-b.

The RIS 205 may include a processing component (e.g., a processor) that may determine a configuration for the RIS 205 (e.g., based on a message from the UE 115-a) and may adjust one or more parameters of the RIS 205 to support the configuration. In some examples, the configuration of the RIS 205 may be preconfigured, statically or semi-statically configured, or configured by a network (e.g., configured by the base station 105-a, the UE 115-a, or the UE 115-b). For example, the base station 105-a or the UE 115-a may transmit a control message to the RIS 205 for configuring one or more elements of the RIS 205. The RIS 205 may adjust the materials, components, or combination thereof to support a specific configuration for one or more elements of the RIS 205 (e.g., based on a control message from the UE 115-a).

The RIS 205 may be deployed in any type of wireless communications system, such as a cellular system including LTE, NR, or the like. The RIS 205 may alter the realization of the wireless channels in a controllable manner, which may enhance channel diversities. For example, for mmW communications, the increased diversity of the channel due to the presence of the RIS 205 may provide robustness to channel blocking or channel fading. Furthermore, the RIS 205 may provide cost and energy efficiencies over wireless relay or repeater systems.

In some aspects, using the RIS 205 (or multiple RISs 205) may extend the coverage area 110-a of the base station 105-a. In some other aspects, using the RIS 205 (or multiple RISs 205) may provide for communications between the base station 105-a and the UE 115-a under conditions in which direct communications may be unreliable. For example, interference resulting from physical proximity or environmental factors (e.g., interference, blockage, etc.) may be avoided or mitigated by communicating via the RIS 205 (or multiple RISs 205). Using the RIS 205 (or multiple RISs 205) may also extend the capabilities of the UE 115-a and the UE 115-b to perform sidelink communications. For example, the UE 115-a may use the RIS 205 to transmit a message to the UE 115-b.

As shown in the example of FIG. 2, the communications link 210 may include an impinging wave that reflects off RIS 205. The RIS 205 may reflect a set of reflected waves 220 towards the UE 115-a and the UE 115-b. The reflected waves 220 may include a first state 215-a through a fourth state 215-d.

According to example aspects of the present disclosure, the base station 105-a may control the RIS 205 for downlink (DL) and uplink (UL) communications with the UE 115-a and the UE 115-b. A type of the RIS 205 may be controllable or non-controllable. If the RIS 205 is controllable, the RIS can receive a control signal from another node (e.g., the base station 105-a or the UE 115-a, etc.) and adjust the state of one or more elements of the RIS 205 based at least in part on the control signal. The RIS 205 may or may not have transmission capability. If the RIS 205 does have a transmission capability, it may be limited.

Alternatively, if the RIS 205 is non-controllable, then the RIS 205 may change the states of one or more elements based on a pre-configured pattern or schedule. For example, the RIS 205 may change states of one or more elements according to a periodic cycling of a set of states. The pattern or schedule may or may not be known to at least a subset of the nodes in the communication system. For example, the base station 105-a may have information regarding the pattern or schedule, while the UE 115-a may not know of the pattern or schedule.

The base station 105-a may have information about the RIS 205, including, for example, the location of the RIS 205, an orientation of the RIS 205, the type of RIS 205, an operating frequency of the RIS 205, a control protocol for the RIS 205 if the RIS 205 is the controllable type, a pattern of state change for the RIS 205 if the RIS 205 is the non-controllable type, or the like. However, the presence of the RIS 205 may be transparent to one or both of the UE 115-a or the UE 115-b, or to other neighboring or overlaid bases stations or to other customer premises equipment (CPE). Without knowing about the RIS 205, one or more nodes in the wireless communications system 200 may not be able to utilize it.

For example, if the UE 115-a does not know about the presence of the RIS 205, it may not be able to use the RIS 205 for improved communications, including for sidelink communications with the UE 115-b. The UE 115-a may not have information regarding the RIS 205 or be able to or allowed to directly control the RIS 205. Furthermore, due to UE 115-a mobility or lack or positioning capability, the UE 115-a may not track the time-varying relative position of the RIS 205. Techniques described herein provides the UE 115-a with a new protocol or procedure for RIS 205 discovery and acquisition of RIS information. These techniques may be used to improve peer-to-peer (i.e., sidelink) communications in NR applications such as IIoT, V2X, and the like.

Techniques described herein enable the UE 115-a to obtain RIS information from the base station 105-a. The UE 115-a may request the RIS information from the base station 105-a or the base station 105-a may send the UE 115-a the RIS information without a request. The UE may sweep a sensing signal towards the potential location of the RIS 205 based on the RIS information, which may include a location of the RIS 205. Once the UE 115-a locates the RIS 205, the UE 115-a may use the RIS 205 to transmit an UL wireless communication to the base station 105-a or to the UE 115-b.

Figure 3A:
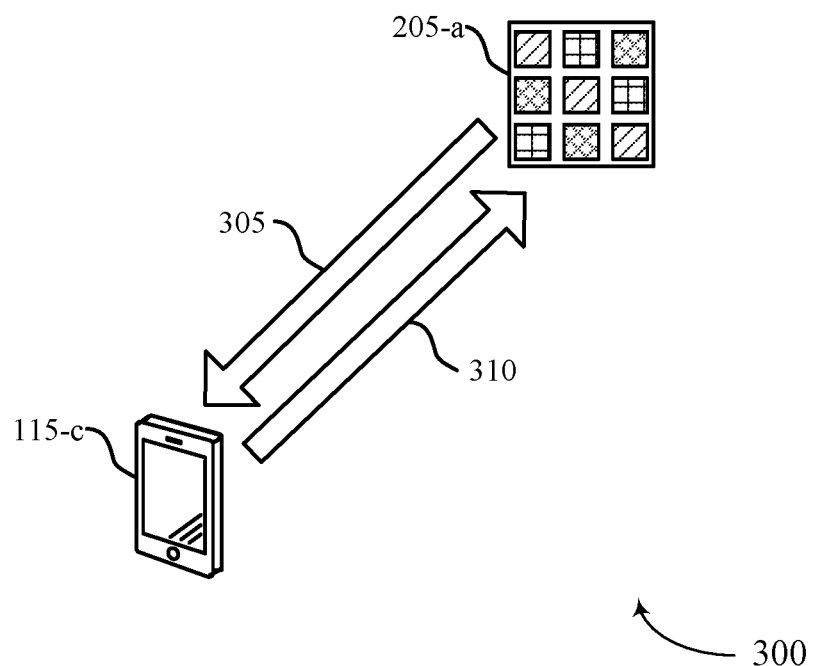
FIGS. 3A and 3B illustrate examples of wireless communications systems that support reconfigurable intelligent surface discovery procedures in accordance with aspects of the present disclosure.

FIG. 3A illustrates an example of a wireless communications system 300 that supports reconfigurable intelligent surface discovery procedures in accordance with aspects of the present disclosure. In some examples, wireless communications system 300 may implement aspects of the wireless communications system 100 or the wireless communication system 200. For example, the wireless communications system 300 may include a UE 115-c and an RIS 205-a, which may be examples of the corresponding devices described herein with reference to FIGS. 1 and 2. In some cases, the wireless communications system 300 may support detection the RIS 205-a using wireless sensing and support transmissions via the RIS 205-a.

In this example, the UE 115-c may have received RIS information from a base station about the RIS 205-a. The RIS information may include, for example, at least one of a number of the one or more RIS 205-a, an operating frequency of the RIS 205-a, a location of the RIS 205-a, a type of the RIS 205-a, a control protocol of the RIS 205-a, a pattern of state change of the RIS 205-a, and a current state of the RIS 205-a. Using this RIS information, the UE 115-c may detect the RIS 205-a. In order to detect the RIS 205-a, the UE 115-c may perform a sweep using a sensing signal of the approximate location of the RIS 205-a. The location of the RIS 205-a may be anywhere in the vicinity of the UE 115-a. In some examples, the location of the RIS 205-a may be more limited based on the RIS information. The UE 115-c may perform mono-static sensing or bi-static sensing to locate the RIS 205.

FIG. 3A illustrates an example of mono-static sensing for RIS discovery. Mono-static sensing may use only a single UE 115-c to detect the RIS 205-a. The UE 115-c may discover the RIS 205-a using wireless sensing. For example, the UE 115-c may send a sensing signal 305 to the RIS 205-a. The UE 115-c may sweep the sensing signal 305 over different directions if it does not have any prior information regarding the location of the RIS 205-a. For example, if the UE 115-c does not have prior information about the location of the RIS 205-a, the UE 115-c may sweep the sensing signal 305 over different directions. Alternatively, if the UE does have some information regarding the possible location of the RIS 205-a, the UE 115-c may sweep the sensing signal 305 over a corresponding directional range. The UE 115-c may monitor for a reflected signal 310 from the RIS 205-a. Properties of the reflected signal 310 may indicate the location of the RIS 205-a to the UE 115-c. The properties may include the direction and intensity of the incoming reflected signal 310, for example. Receiving the reflected signal 310 related to the sensing signal 305 may indicate a direction of the RIS 205-a to the UE 115-c.

In some examples, the UE 115-c may receive more reflected signals in addition to the reflected signal 310. Some of these additional signals may be reflections from other RISs or from other types of objects in the wireless environment. The UE 115-c may distinguish the one or more RISs among the different objects using the RIS information. That is, the UE 115-c may monitor the return signals and differentiate the reflected signal 310 reflection from those signals from the static background.

If there is more than one RIS, the UE may select one of the multiple RISs to facilitate communication with the base station or UE based on the configuration information for the multiple RISs. In some aspects, the UE may transmit, to the base station, feedback indicating the selected RIS. In some examples, the UE 115-c may use multiple RISs to communicate with the other UE. For example, if a path between a UE 115-c and the other UE using an RIS is obstructed, experiences interference, or otherwise drops below a quality or signal strength threshold, the UE 115-c may use another RIS (or RISs) to communicate with the other UE via a different path. As such, communication using one or more RISs may provide increased spatial diversity, cell coverage, and throughput, among other benefits.

Figure 3B:
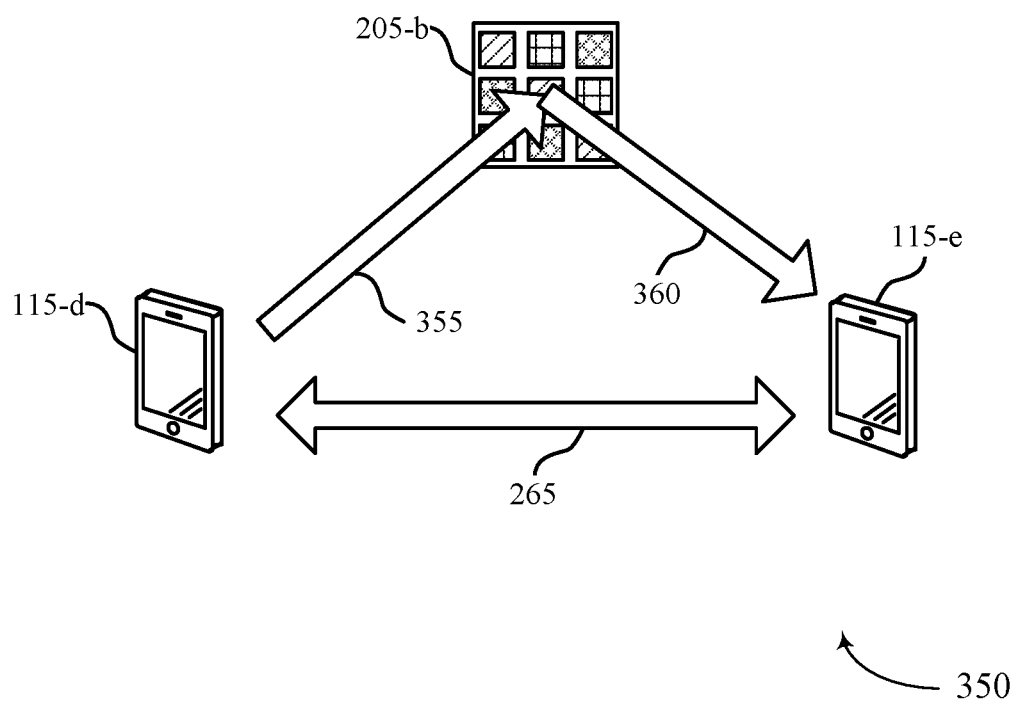

FIG. 3B illustrates an example of a wireless communications system 350 that supports reconfigurable intelligent surface discovery procedures in accordance with aspects of the present disclosure. In some examples, wireless communications system 350 may implement aspects of the wireless communications system 100, the wireless communication system 200, or the wireless communications system 300. For example, the wireless communications system 350 may include a UE 115-d, a UE 115-e, and an RIS 205-b, which may be examples of the corresponding devices described herein with reference to FIGS. 1, 2, and 3A. In some cases, the wireless communications system 350 may support detection the RIS 205-b using wireless sensing and support transmissions via the RIS 205-b.

FIG. 3B illustrates an example of bi-static sensing for RIS discovery. Bi-static sensing may use two UEs, such as UE 115-d and UE 115-e, to detect the RIS 205-b. For example, the UE 115-d may discover the RIS 205-b using wireless sensing with the aid of the UE 115-e. The UE 115-d may send a sensing signal 355 to the RIS 205-b. As discussed above, the UE 115-c may sweep the sensing signal 355 over different directions if it does not have any prior information regarding the location of the RIS 205-b or may sweep the sensing signal 355 over a more targeted directional range if the UE 115-d does have more precise location information about the RIS 205-b.

The UE 115-e may monitor for a reflected signal 360 from the RIS 205-b. Upon receiving the reflected signal 360, the UE 115-e may communicate with the UE 115-d regarding the location of the RIS 205-b using communication link 265. The UE 115-d may also monitor for the reflected signal 360 from the RIS 205-b.

The UE 115-d may choose mono-static sensing when there are no other known UEs within communication range or may choose bi-static sensing when there are other UEs within range. Mono-static sensing may use less processing than bi-static sensing because the return signal 360 may be in the same direction as the sensing signal 355. Mono-static sensing may enable the UE 115-d to perform the RIS discovery procedure autonomously. However, the UE 115-d may need to have full duplex capability to perform mono-static sensing in order for the UE 115-d to receive the reflected signal 360 while transmitting the sensing signal 355. If the UE 115-d does not have full duplex capability, the UE 115-d may choose to perform bi-static sensing with another UE, such as the UE 115-e.

Figure 4:
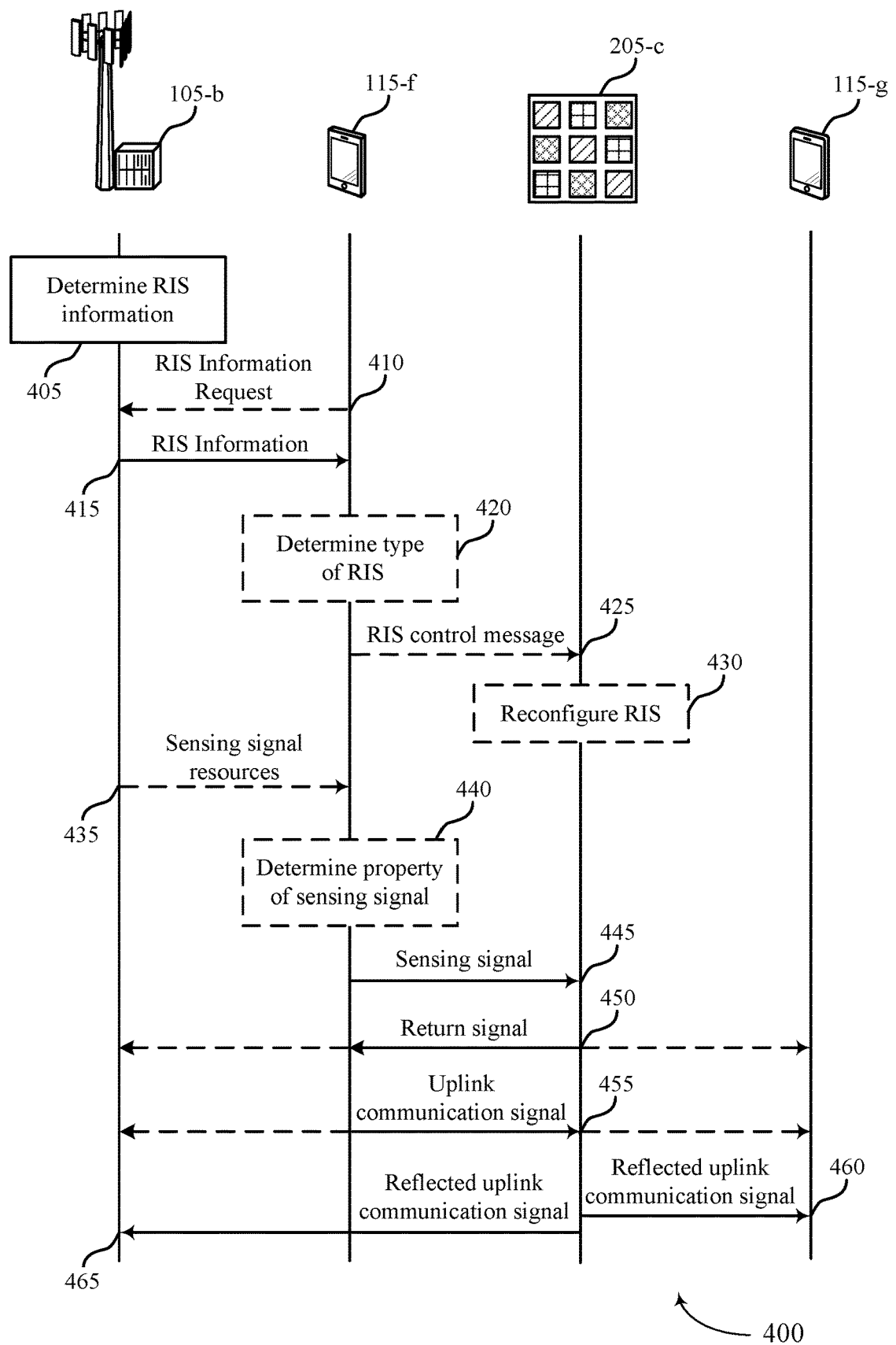
FIG. 4 illustrates an example of a flow diagram that supports reconfigurable intelligent surface discovery procedures in accordance with aspects of the present disclosure.

FIG. 4 illustrates an example of a diagram 400 that supports reconfigurable intelligent surface discovery procedures in accordance with aspects of the present disclosure. In some examples, the diagram 400 may implement aspects of the wireless communications systems 100, 200, 300, and 350 as described herein. For example, the diagram may include a base station 105-b, a UE 115-f, a UE 115-g, and an RIS 205-c, which may be examples of the corresponding devices described herein with reference to FIGS. 1, 2, 3A, and 3B. In some cases, the diagram 400 may support detection the RIS 205-c using wireless sensing and support transmissions via the RIS 205-c.

At 405, the base station 105-b may determine RIS information for the one or more RISs within a coverage area of the base station 105-b. For example, the base station 105-b may have knowledge regarding the RIS 205-c, which may be located within the coverage area of the base station 105-b. The RIS information that the base station 105-b may determine can include at least one of a number of the RISs, an operating frequency of the RIS 205-c, a location of the RIS 205-c, a type of the RIS 205-c, a control protocol of the RIS 205-c, a pattern of state change of the RIS 205-c, and a current state of the RIS 205-c. If there are more than one RISs, the base station 105-b may obtain RIS information for some or all of the RISs. In some examples, the base station 105-b and the RIS 205-c may have a wired or wireless connection.

The UE 115-f may seek information about the one or more RISs, such as the RIS 205-c. The UE 115-f may send an RIS information request 410 to the base station 105-b. The RIS information request 410 may ask the base station 105-b for any or all information regarding the RIS 205-c and any other RISs within the coverage area. The RIS information request 410 may be sent via a radio resource control signal, a MAC-CE, a physical uplink control channel (PUCCH), or a physical random access channel (PRACH), which may be an on-demand SI request. Alternatively, the base station 105-b may send the RIS information to the UE 115-f without receiving the RIS information request 410.

The base station 105-b may send the RIS information 415 to the UE 115-f. The RIS information may include any of the RIS information that the base station 105-b is aware of, including but not limited to, a number of the RISs, an operating frequency of the RISs, a location of the RISs, a 3-dimensional position of the RISs, a synchronization signal block (SSB) associated with the RIS, a CSI-RS associated with the RIS, a type of the RISs, a control protocol of the RISs, a pattern of state change of the RISs, and a current state of the RISs. The indication of the RIS information 415 may use system information, RRC signaling, MAC-CE, and/or DCI (e.g., PDCCH).

In some examples, the UE 115-f may determine a type of the RIS 205-c at 420. The type of the RIS 205-c may be controllable or non-controllable. If the RIS 205-c is controllable, the UE 115-f may send an RIS control message 425 to the RIS 205-c. The RIS control message 425 may indicate to the RIS 205-c how to change the state of one or more configurable elements.

The UE 115-f may sometimes send the RIS control message for the RIS 205-c before performing the sensing signal sweep and discovering the RIS 205-c. If so, the UE 115-f may sweep the RIS control message 425 over the potential locations for the RIS 205-c. Between the RIS control message 425 and the sensing signal 430, some time gap for the RIS control message 425 processing or a reconfiguration delay may be used. That is, the UE 115-f may wait the delay period after sending the RIS control message 425 before sending the sensing signal 430 in order to allow the RIS 206-c to reconfigure itself. In some examples, a minimum length of the delay period may be informed (via RIS information delivery from the base station 105-b) or configured for the UE 115-f. The RIS 205-c may reconfigure itself at 430 based at least in part on the RIS control message 425. However, in some examples, if the RIS 205-c is non-configurable, the UE 115-f may not send the RIS control message 425.

The base station 105-b may allocate sensing signal resources 435 to the UE 115-f. The UE 115-f may be configured and indicated with dedicated resources for the RIS 206-c discovery. The sensing signal resources 435 may include an indication of resources for the UE 115-f to use for a sensing signal 445 used to detect the RIS 205-c. The sensing signal resources 435 may include one or more of time or frequency resources, a sensing signal waveform, and peer-to-peer communication resources. The UE 115-f may determine a property of the sensing signal at 440, which may include a time or frequency resource to use, a sensing signal waveform, and peer-to-peer communication resources. For example, the UE 115-f may determine a sensing duration and periodicity based on the RIS state change pattern and periodicity. In some examples, the UE 115-f may determine the sensing signal (e.g., the waveform, bandwidth, sensing direction, etc.) and an RIS control signal (e.g., time or frequency resource, format, etc.) based on the RIS location and type information. For bi-static sensing examples, the UE 115-f may be configured with resources for peer-to-peer communication.

Using the RIS information, the UE 115-f may autonomously sense the RIS 205-c. The UE 115-f may sweep a sensing signal 445 to detect the RIS 205-c. The UE 115-f may sweep the sensing signal 445 in directions based on the RIS information. If the UE 115-f has location information for the RIS 205-c, the UE 115-f may sweep the sensing signal 445 over an associated directional range (e.g., over an area close to approximately where the RIS 205-c may be located according to the RIS information). If the UE 115-f does not have location information for the RIS 205-c, the UE 115-f may sweep the sensing signal 445 until a return signal from the RIS 205-c is detected.

Once the sensing signal 445 is incident upon the RIS 205-c, the return signal 450 may be reflected back to the UE 115-f. The UE 115-f may determine the location of the RIS 205-c based on the return signal 450. In some examples, the UE 115-f may keep track of the location of the RIS 205-c based on a mobility of the UE 115-f. In other examples, the UE 115-f may reperform the discovery process as needed.

The example of FIG. 4 shows mono-static sensing, because the UE 115-f receives the return signal 450 from the RIS 205-c itself, rather than a signal indicating the location of the RIS 205-c or an indication of the return signal from another UE, such as the UE 115-g. However, the UE 115-f may perform bi-static sensing, and the UE 115-g may send an indication of the return signal 450 to the UE 115-f. As shown in FIG. 4, different stages of the return signal 450 may also be reflected towards the base station 105-b and the UE 115-g.

The UE 115-f may send an uplink communication signal 455 to the RIS 205-c. The RIS 205-c may reflect the uplink communication signal 455 towards the base station 105-b or the UE 115-g. For example, if the UE 115-f is to communicate via sidelink with the UE 115-g, the RIS 205-c may reflect the reflected uplink communication signal 460 towards the UE 115-g. However, if the UE 115-f is using the RIS 205-c to improve communications with the base station 105-b, the RIS 205-c may reflect the reflected uplink communication signal 465 towards the base station 105-b. The UE 115-f may continue to communicate with the UE 115-g or the base station 105-b via the RIS 205-c as needed.

In examples where the UE 115-f may receive more than one return signal, the UE 115-f may distinguish the RIS 205-c from other non-RIS target objects based on the RIS information. For configurable RISs, the UE 115-f may try different RIS states by sending different control messages 425 until the UE 115-f detects a reflected signal. For non-controllable RISs, the UE 115-f may calculate a correlation between a time-varying pattern of a reflected signal and an RIS state change pattern and periodicity.

Figure 5:
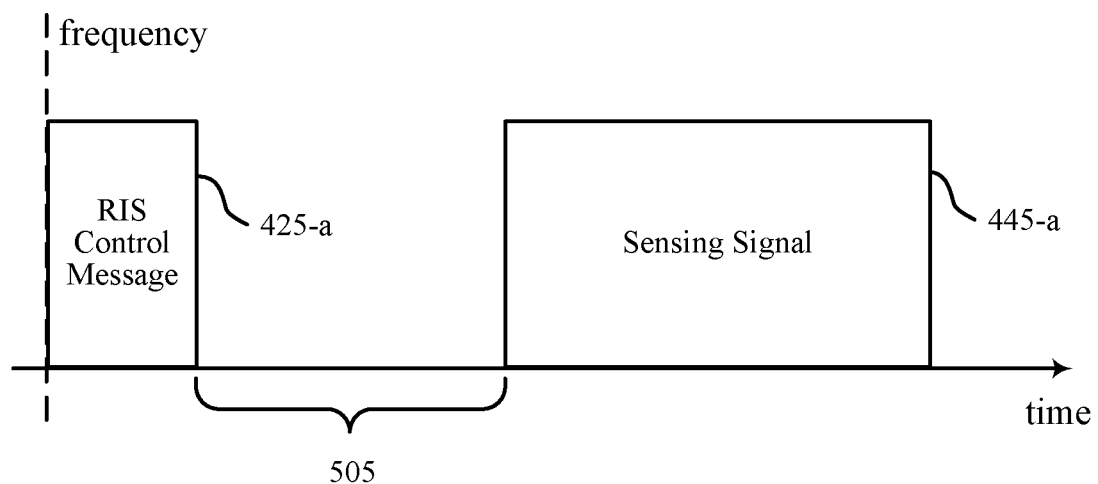
FIG. 5 illustrates an example of a block diagram that supports reconfigurable intelligent surface discovery procedures in accordance with aspects of the present disclosure.

FIG. 5 illustrates an example of a block diagram 500 that supports reconfigurable intelligent surface discovery procedure based on wireless sensing in accordance with aspects of the present disclosure. In some examples, block diagram 500 may be implemented in aspects of the wireless communications systems 100, 200, 300, or 350. For example, a UE 115 may implement concepts from the block diagram 500.

The block diagram 500 includes a graph of frequency over time that includes an RIS control message 425-a and a sensing signal 445-a. For controllable RISs, the UE 115 may send the RIS control message 425-a prior to the sensing signal 445-a. For example, the UE 115 may send the RIS control message 425-a a first time before sending the sensing signal 445-a. There may be a delay period 505 between the RIS control message 425-a and the sensing signal 445-a. The delay period 505 may be for the RIS to process the RIS control message 425-a. The delay period 505 may be based on the RIS information, a configuration from a base station, a known processing delay, the content of the RIS control message 425-a, how many elements of the RIS need to be adjusted based on the RIS control message 425-a, or the like. In some examples, a minimum length of the gap or delay period 505 may be informed (e.g., via RIS information delivery) or configured for the sensing UE 115.

Figure 6:
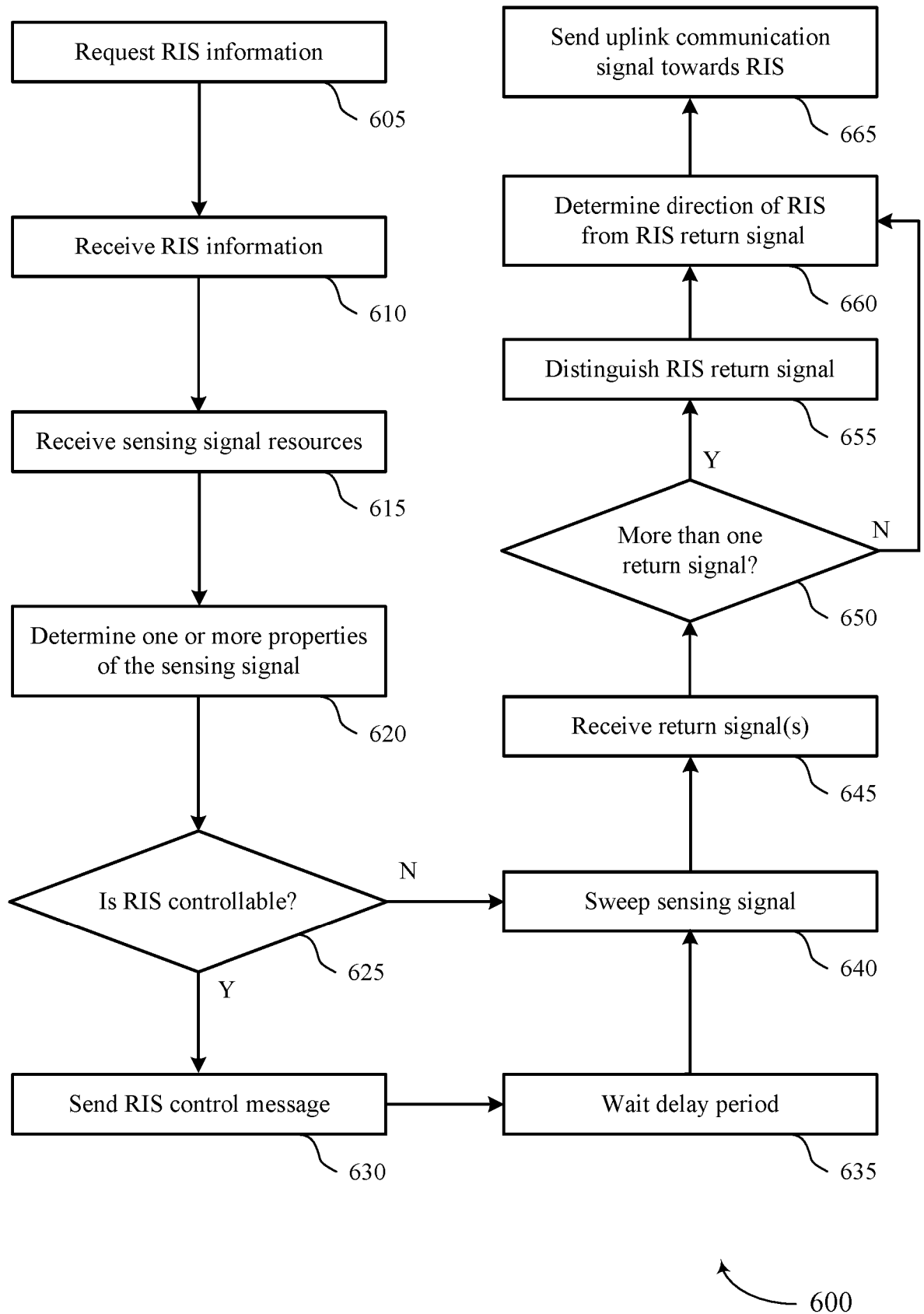
FIG. 6 illustrates an example of a method that supports reconfigurable intelligent surface discovery procedures in accordance with aspects of the present disclosure.

FIG. 6 illustrates an example of a method 600 that supports reconfigurable intelligent surface discovery procedure based on wireless sensing in accordance with aspects of the present disclosure. In some examples, the method 600 may implement aspects of the wireless communications systems 100, 200, 300, or 350 as described herein. The operations of the method 600 may be implemented by a UE or its components as described herein. For example, the operations of the method 600 may be performed by a UE 115 as described with reference to FIGS. 1 through 5. In some examples, a UE may execute a set of instructions to control the functional elements of the UE to perform the described functions. Additionally, or alternatively, the UE may perform aspects of the described functions using special-purpose hardware.

At 605, the method 600 may include the UE requesting RIS information from a base station. At 610, the UE may receive the RIS information from the base station. At 615, the UE may receive sensing signal resources from the base station. The sensing signal resources may be based on mono-static sensing, bi-static sensing, or both. At 620, the UE may determine one or more properties of the sensing signal from the sensing signal resources and the RIS information.

At 625, the method 600 may include the UE determining whether one or more of the RISs is controllable. If at least one of the RISs is controllable, the method 600 proceeds to 630. At 630, the UE may send an RIS control message to or towards the possible location of the RIS. The RIS control message may include configuration information for the RIS based at least in part on how the UE wants to use the RIS for communications. The UE may wait a delay period at 635 for the RIS to process the RIS control message. The UE may repeat 625, 630, and 635 for each RIS. The method 600 proceeds to 640.

If none of the RISs are controllable, the method 600 proceeds to 640. At 640, the UE may sweep the sensing signal over the likely locations of the RIS. At 645, the UE receives one or more return signals. At 650, the UE may determine if more than one return signal was received. If there are more than one return signal received, the UE may distinguish the RIS return signal from the other return signals at 655 and the method 600 proceeds to 660. If there was only a single return signal received and the UE can determine it is from the RIS, the method 600 proceeds to 660.

At 600, the UE determines the direction, and possibly the location, of the RIS based at least in part on the RIS return signal and the RIS information. At 665, the UE may send one or more uplink communications signals towards the RIS in order to use the RIS for communications with a base station or another UE.

Figure 7:
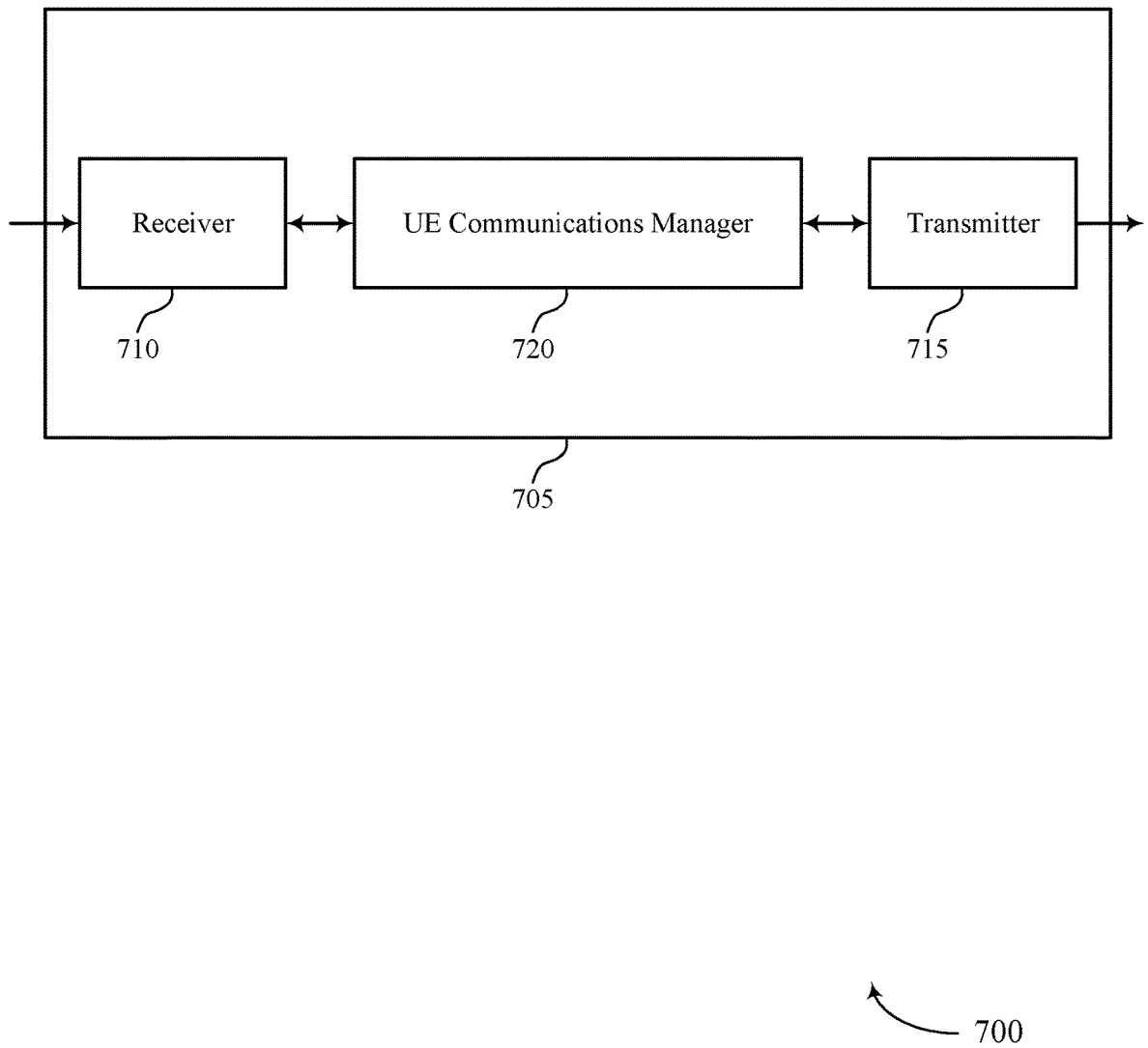
FIGS. 7 and 8 show block diagrams of devices that support reconfigurable intelligent surface discovery procedures in accordance with aspects of the present disclosure.

FIG. 7 shows a block diagram 700 of a device 705 that supports reconfigurable intelligent surface discovery procedures in accordance with aspects of the present disclosure. The device 705 may be an example of aspects of a UE 115 as described herein. The device 705 may include a receiver 710, a transmitter 715, and a UE communications manager 720. The UE communications manager 720 may be an example of aspects of a UE communications manager 175 as described herein. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to reconfigurable intelligent surface discovery procedure based on wireless sensing). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to reconfigurable intelligent surface discovery procedure based on wireless sensing). In some examples, the transmitter 715 may be co-located with a receiver 710 in a transceiver module. The transmitter 715 may utilize a single antenna or a set of multiple antennas.

The UE communications manager 720, the receiver 710, the transmitter 715, or various combinations thereof or various components thereof may be examples of means for performing various aspects of reconfigurable intelligent surface discovery procedure based on wireless sensing as described herein. For example, the UE communications manager 720, the receiver 710, the transmitter 715, or various combinations or components thereof may support a method for performing one or more of the functions described herein.

In some examples, the UE communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the UE communications manager 720, the receiver 710, the transmitter 715, or various combinations or components thereof may be implemented in code (e.g., as communications management software or firmware) executed by a processor. If implemented in code executed by a processor, the functions of the UE communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the UE communications manager 720 may be configured to perform various operations (e.g., receiving, monitoring, transmitting) using or otherwise in cooperation with the receiver 710, the transmitter 715, or both. For example, the UE communications manager 720 may receive information from the receiver 710, send information to the transmitter 715, or be integrated in combination with the receiver 710, the transmitter 715, or both to receive information, transmit information, or perform various other operations as described herein.

The UE communications manager 720 may support wireless communication at a first UE in a wireless communications system in accordance with examples as disclosed herein. For example, the UE communications manager 720 may be configured as or otherwise support a means for receiving, from a base station, information associated with one or more reconfigurable intelligent surfaces in the wireless communications system. The UE communications manager 720 may be configured as or otherwise support a means for transmitting a sensing signal to the one or more reconfigurable intelligent surfaces based on the information. The UE communications manager 720 may be configured as or otherwise support a means for transmitting an uplink wireless communication to the base station or a second UE using the one or more reconfigurable intelligent surfaces based on the sensing.

By including or configuring the UE communications manager 720 in accordance with examples as described herein, the device 705 (e.g., a processor controlling or otherwise coupled to the receiver 710, the transmitter 715, the UE communications manager 720, or a combination thereof) may support techniques for reduced power consumption, more efficient utilization of communication resources, improved sidelink communications, and reduced processing.

Figure 8:
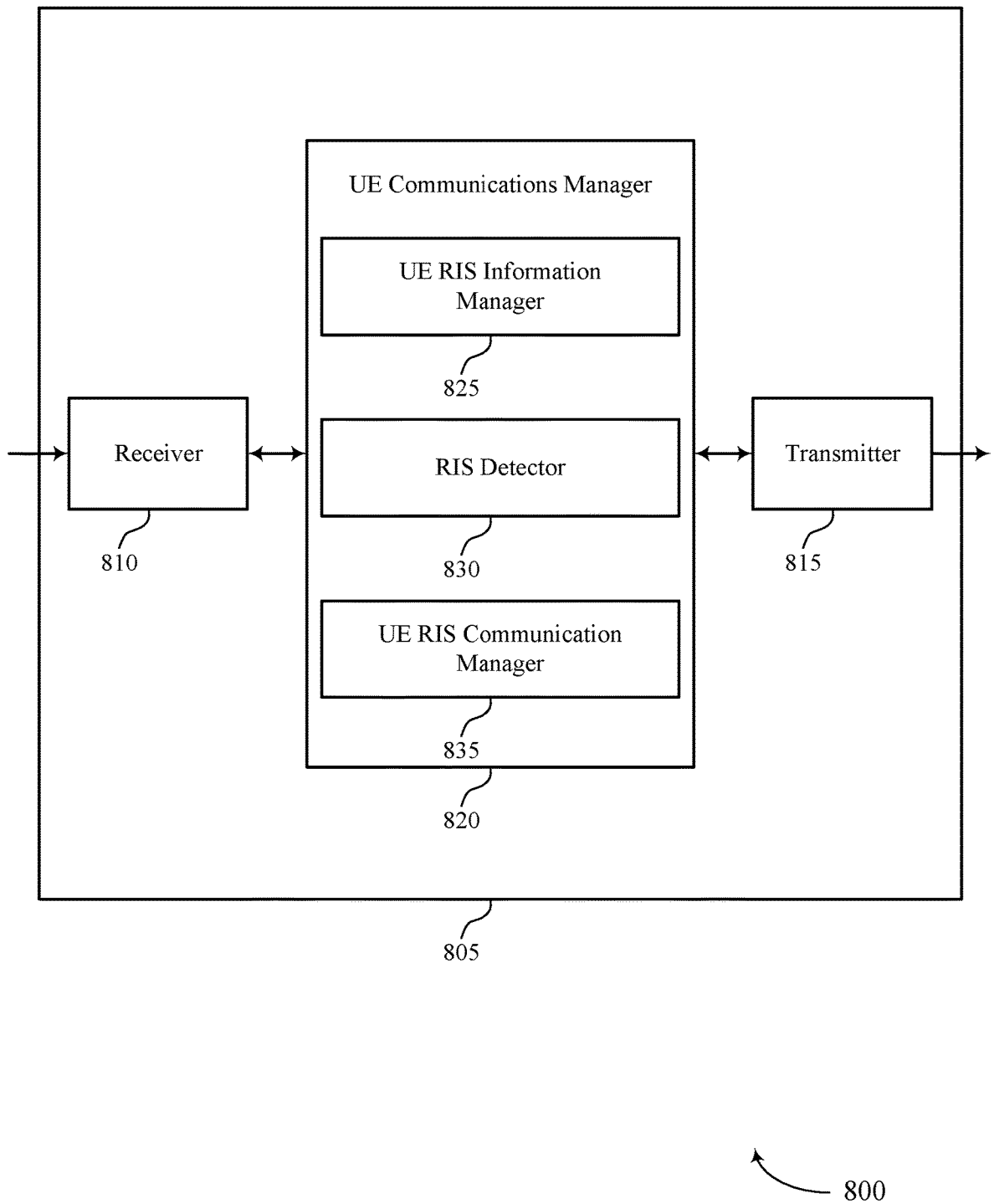

FIG. 8 shows a block diagram 800 of a device 805 that supports reconfigurable intelligent surface discovery procedures in accordance with aspects of the present disclosure. The device 805 may be an example of aspects of a device 705 or a UE 115 as described herein. The device 805 may include a receiver 810, a transmitter 815, and a UE communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to reconfigurable intelligent surface discovery procedure based on wireless sensing). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to reconfigurable intelligent surface discovery procedure based on wireless sensing). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of reconfigurable intelligent surface discovery procedure based on wireless sensing as described herein. For example, the UE communications manager 820 may include a UE RIS information manager 825, an RIS detector 830, a UE RIS communication manager 835, or any combination thereof. The UE communications manager 820 may be an example of aspects of a UE communications manager 175 and 720 as described herein. In some examples, the UE communications manager 820, or various components thereof, may be configured to perform various operations (e.g., receiving, monitoring, transmitting) using or otherwise in cooperation with the receiver 810, the transmitter 815, or both. For example, the UE communications manager 820 may receive information from the receiver 810, send information to the transmitter 815, or be integrated in combination with the receiver 810, the transmitter 815, or both to receive information, transmit information, or perform various other operations as described herein.

The UE communications manager 820 may support wireless communication at a first UE in a wireless communications system in accordance with examples as disclosed herein. The UE RIS information manager 825 may be configured as or otherwise support a means for receiving, from a base station, information associated with one or more reconfigurable intelligent surfaces in the wireless communications system. The RIS detector 830 may be configured as or otherwise support a means for transmitting a sensing signal to the one or more reconfigurable intelligent surfaces based on the information. The UE RIS communication manager 835 may be configured as or otherwise support a means for transmitting an uplink wireless communication to the base station or a second UE using the one or more reconfigurable intelligent surfaces based on the sensing.

Figure 9:
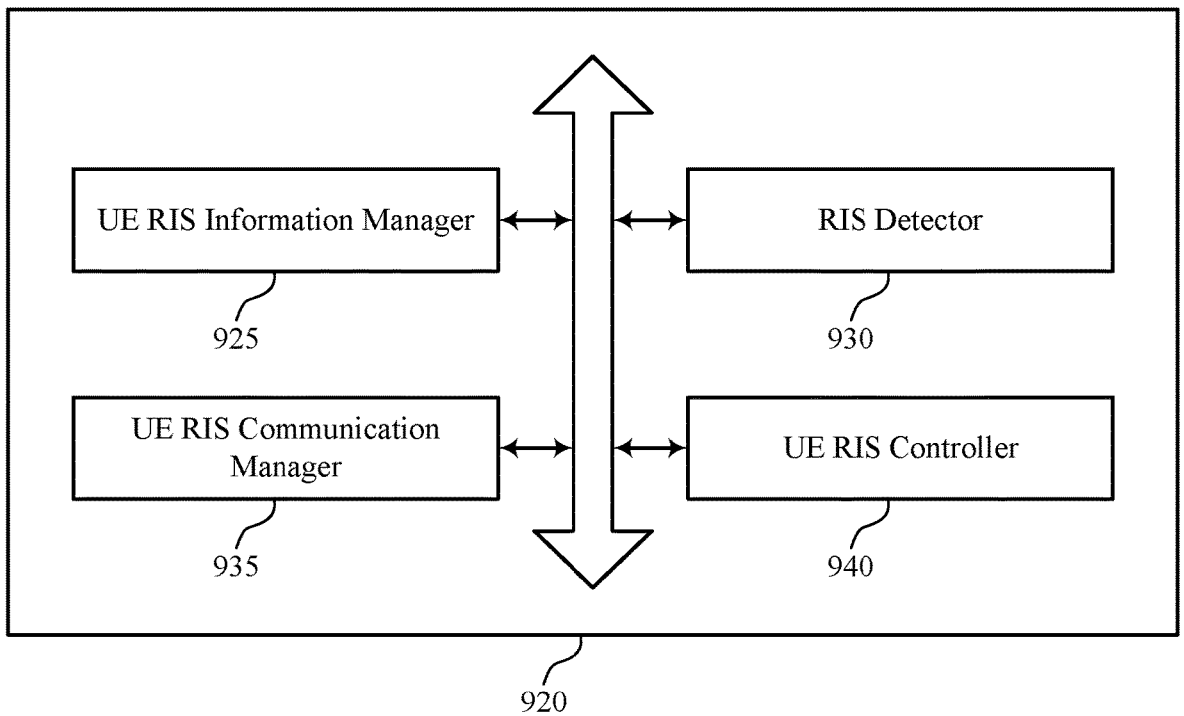
FIG. 9 shows a block diagram of a communications manager that supports reconfigurable intelligent surface discovery procedures in accordance with aspects of the present disclosure.

FIG. 9 shows a block diagram 900 of a UE communications manager 920 that supports reconfigurable intelligent surface discovery procedure based on wireless sensing in accordance with aspects of the present disclosure. The UE communications manager 920 may be an example of aspects of a UE communications manager 175, a UE communications manager 720, a UE communications manager 820, as described herein. The UE communications manager 920, or various components thereof, may be an example of means for performing various aspects of reconfigurable intelligent surface discovery procedure based on wireless sensing as described herein. For example, the UE communications manager 920 may include a UE RIS information manager 925, an RIS detector 930, a UE RIS communication manager 935, a UE RIS controller 940, or any combination thereof. Each of these components may communicate, directly or indirectly, with one another (e.g., via one or more buses).

The UE communications manager 920 may support wireless communication at a first UE in a wireless communications system in accordance with examples as disclosed herein. The UE RIS information manager 925 may be configured as or otherwise support a means for receiving, from a base station, information associated with one or more RISs in the wireless communications system. The RIS detector 930 may be configured as or otherwise support a means for transmitting a sensing signal to the one or more reconfigurable intelligent surfaces based on the information. The UE RIS communication manager 935 may be configured as or otherwise support a means for transmitting an uplink wireless communication to the base station or a second UE using the one or more reconfigurable intelligent surfaces based on the sensing.

In some examples, the UE RIS information manager 925 may be configured as or otherwise support a means for requesting, from the base station, the information associated with the one or more RISs, where receiving the information is based on the requesting.

In some examples, to support requesting the information, the UE RIS information manager 925 may be configured as or otherwise support a means for transmitting a request via a radio resource control signal, a MAC control element, a physical uplink control channel, or a physical random access channel.

In some examples, to support transmitting the sensing signal to the one or more reconfigurable intelligent surfaces, the RIS detector 930 may be configured as or otherwise support a means for sweeping the sensing signal over a directional range. In some examples, to support transmitting the sensing signal to the one or more reconfigurable intelligent surfaces, the RIS detector 930 may be configured as or otherwise support a means for receiving a return signal related to the sensing signal that indicates a direction of a first reconfigurable intelligent surface of the one or more reconfigurable intelligent surfaces.

In some examples, the return signal related to the sensing signal may include a reflection of the sensing signal off the first RIS. In some examples, the return signal related to the sensing signal includes a signal from the second UE based on the second UE detecting a reflection of the sensing signal from the first RIS.

In some examples, the RIS detector 930 may be configured as or otherwise support a means for determining a property of the sensing signal based on the information associated with the one or more RISs.

In some examples, the RIS detector 930 may be configured as or otherwise support a means for receiving one or more return signals related to the sensing signal that indicate a presence of a set of multiple objects. In some examples, the RIS detector 930 may be configured as or otherwise support a means for distinguishing the one or more RISs among the set of multiple objects based on the information associated with the one or more RISs.

In some examples, the UE RIS information manager 925 may be configured as or otherwise support a means for receiving an indication of resources to use for the sensing signal. In some examples, the resources may include one or more of time or frequency resources, a sensing signal waveform, and peer-to-peer communication resources.

In some examples, the UE RIS controller 940 may be configured as or otherwise support a means for transmitting a reconfigurable intelligent surface control message to the first reconfigurable intelligent surface.

In some examples, the UE RIS controller 940 may be configured as or otherwise support a means for determining that a type of a first RIS of the one or more RISs is a controllable RIS based on the information, where the RIS control message is based on the type of the first RIS.

In some examples, to support transmitting the sensing signal, the UE RIS controller 940 may be configured as or otherwise support a means for transmitting the sensing signal to the first RIS at a first time after a delay period from a second time of transmitting the RIS control message.

In some examples, the UE RIS controller 940 may be configured as or otherwise support a means for determining the delay period based on a configuration of the first UE or a configuration signal received at the first UE.

In some examples, the information associated with the one or more RISs includes at least one of a number of the one or more RISs, an operating frequency of a first RIS of the one or more RISs, a location of the first RIS, a type of the first RIS, a control protocol of the first RIS, a pattern of state change of the first RIS, and a current state of the first RIS, or combinations thereof.

Figure 10:
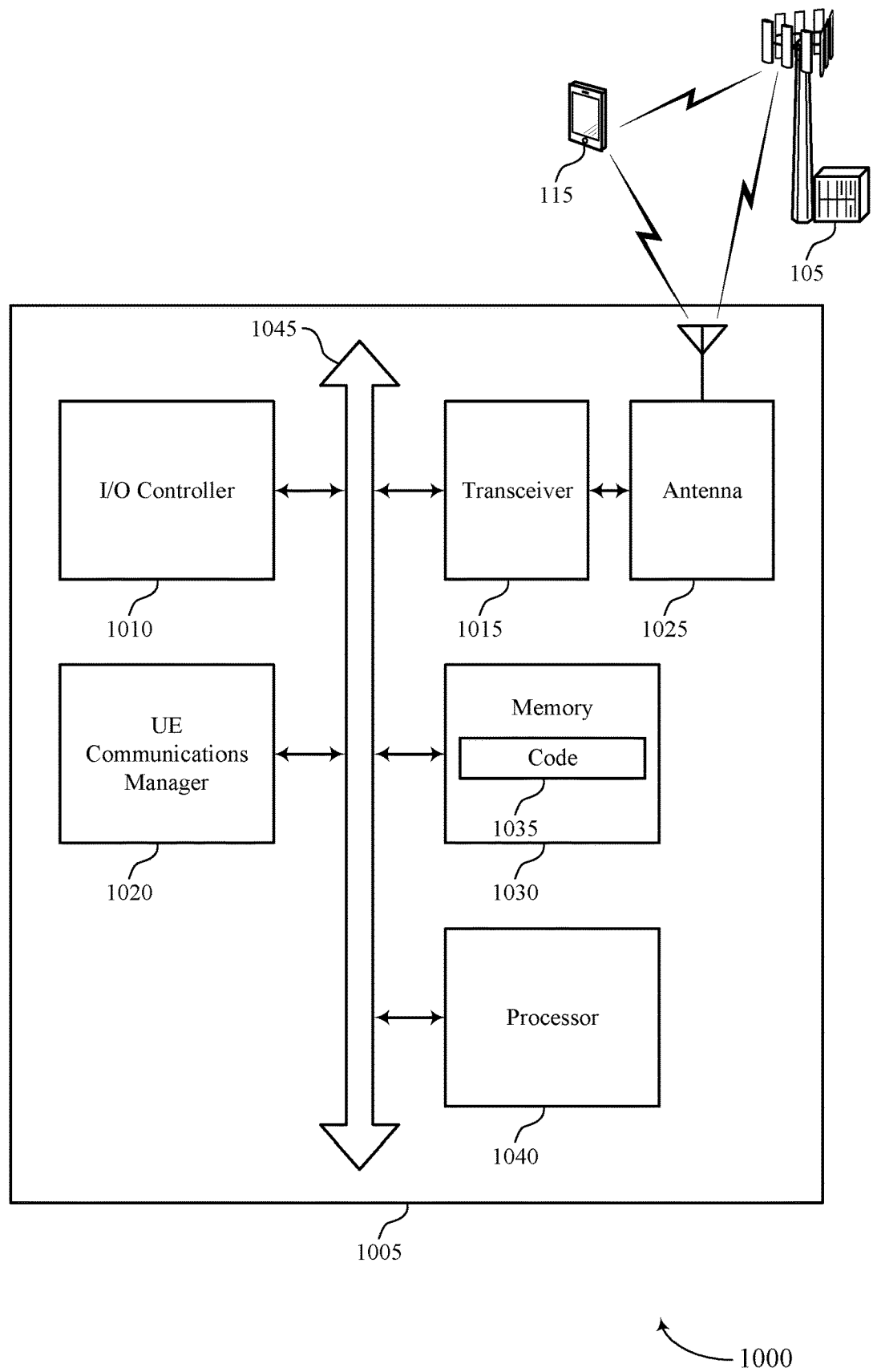
FIG. 10 shows a diagram of a system including a device that supports reconfigurable intelligent surface discovery procedures in accordance with aspects of the present disclosure.

FIG. 10 shows a diagram of a system 1000 including a device 1005 that supports reconfigurable intelligent surface discovery procedures in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a UE communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, RIS-DOS®, RIS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting reconfigurable intelligent surface discovery procedure based on wireless sensing). For example, the device 1005 or a component of the device 1005 may include a processor 1040 and memory 1030 coupled to the processor 1040, the processor 1040 and memory 1030 configured to perform various functions described herein.

The UE communications manager 1020 may support wireless communication at a first UE in a wireless communications system in accordance with examples as disclosed herein. For example, the UE communications manager 1020 may be configured as or otherwise support a means for receiving, from a base station, information associated with one or more RISs in the wireless communications system. The UE communications manager 1020 may be configured as or otherwise support a means for transmitting a sensing signal to the one or more RISs based on the information. The UE communications manager 1020 may be configured as or otherwise support a means for transmitting an uplink wireless communication to the base station or a second UE using the one or more RISs based on the sensing.

By including or configuring the UE communications manager 1020 in accordance with examples as described herein, the device 1005 may support techniques for improved communication reliability, reduced latency, improved sidelink communications, reduced interference, improved user experience related to reduced processing, reduced power consumption, more efficient utilization of communication resources, improved coordination between devices, and longer battery life.

In some examples, the UE communications manager 1020 may be configured to perform various operations (e.g., receiving, monitoring, transmitting) using or otherwise in cooperation with the transceiver 1015, the one or more antennas 1025, or any combination thereof. Although the UE communications manager 1020 is illustrated as a separate component, in some examples, one or more functions described with reference to the UE communications manager 1020 may be supported by or performed by the processor 1040, the memory 1030, the code 1035, or any combination thereof. For example, the code 1035 may include instructions executable by the processor 1040 to cause the device 1005 to perform various aspects of reconfigurable intelligent surface discovery procedure based on wireless sensing as described herein, or the processor 1040 and the memory 1030 may be otherwise configured to perform or support such operations.

Figure 11:
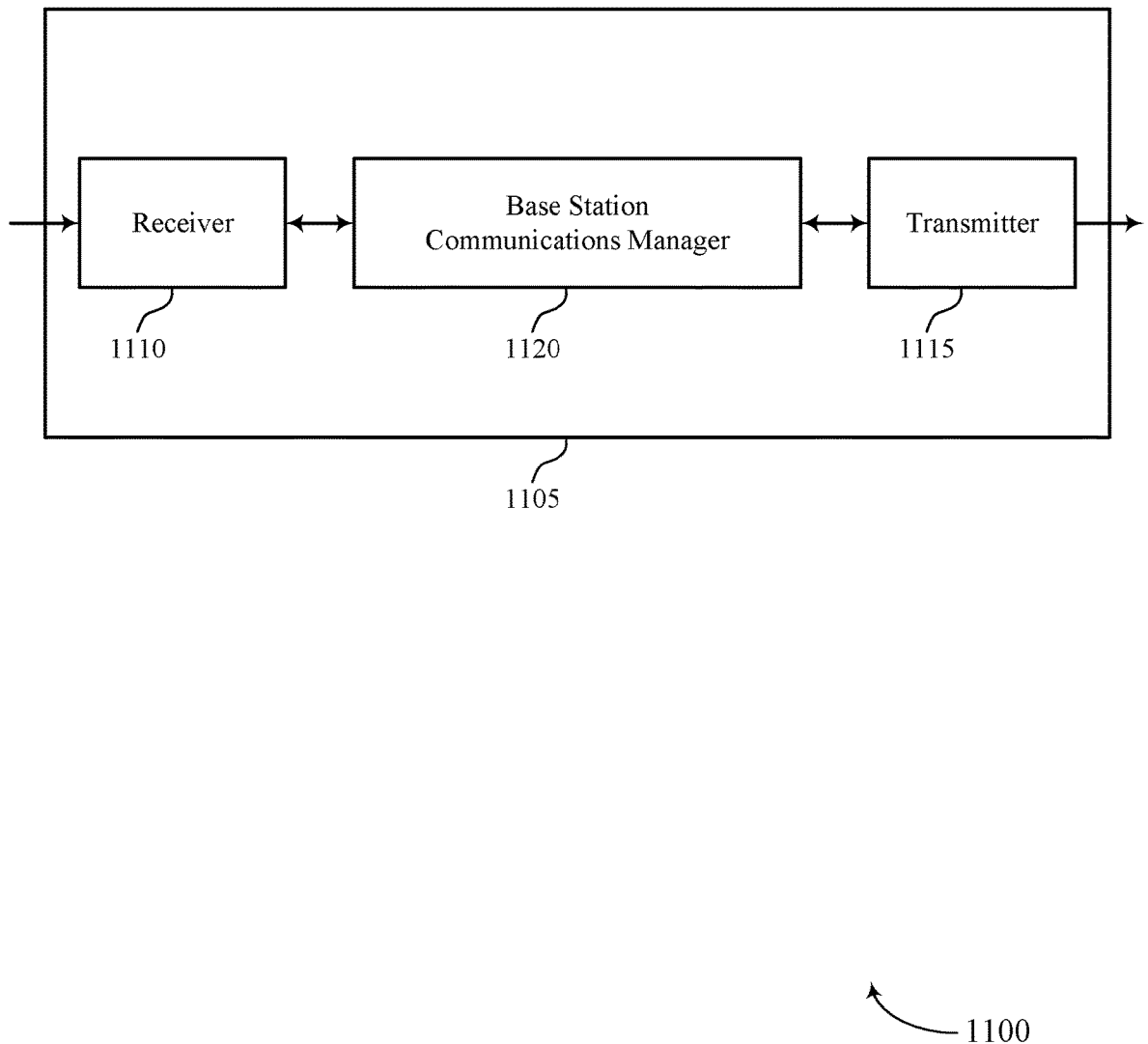
FIGS. 11 and 12 show block diagrams of devices that support reconfigurable intelligent surface discovery procedures in accordance with aspects of the present disclosure.

FIG. 11 shows a block diagram 1100 of a device 1105 that supports reconfigurable intelligent surface discovery procedures in accordance with aspects of the present disclosure. The device 1105 may be an example of aspects of a base station 105 as described herein. The device 1105 may include a receiver 1110, a transmitter 1115, and a base station communications manager 1120. The base station communications manager 1120 may be an example of aspects of a base station communications manager 170 as described herein. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to RIS discovery procedure based on wireless sensing). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to RIS discovery procedure based on wireless sensing). In some examples, the transmitter 1115 may be co-located with a receiver 1110 in a transceiver module. The transmitter 1115 may utilize a single antenna or a set of multiple antennas.

The base station communications manager 1120, the receiver 1110, the transmitter 1115, or various combinations thereof or various components thereof may be examples of means for performing various aspects of RIS discovery procedure based on wireless sensing as described herein. For example, the base station communications manager 1120, the receiver 1110, the transmitter 1115, or various combinations or components thereof may support a method for performing one or more of the functions described herein.

In some examples, the base station communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the base station communications manager 1120, the receiver 1110, the transmitter 1115, or various combinations or components thereof may be implemented in code (e.g., as communications management software or firmware) executed by a processor. If implemented in code executed by a processor, the functions of the base station communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the base station communications manager 1120 may be configured to perform various operations (e.g., receiving, monitoring, transmitting) using or otherwise in cooperation with the receiver 1110, the transmitter 1115, or both. For example, the base station communications manager 1120 may receive information from the receiver 1110, send information to the transmitter 1115, or be integrated in combination with the receiver 1110, the transmitter 1115, or both to receive information, transmit information, or perform various other operations as described herein.

The base station communications manager 1120 may support wireless communication at a base station in a wireless communications system in accordance with examples as disclosed herein. For example, the base station communications manager 1120 may be configured as or otherwise support a means for determining information associated with one or more RISs in the wireless communications system. The base station communications manager 1120 may be configured as or otherwise support a means for transmitting, to a UE, the information associated with the one or more RISs. The base station communications manager 1120 may be configured as or otherwise support a means for communicating with the UE via the one or more RISs based on the information associated with the one or more RISs.

By including or configuring the base station communications manager 1120 in accordance with examples as described herein, the device 1105 (e.g., a processor controlling or otherwise coupled to the receiver 1110, the transmitter 1115, the base station communications manager 1120, or a combination thereof) may support techniques for more efficient utilization of communication resources.

Figure 12:
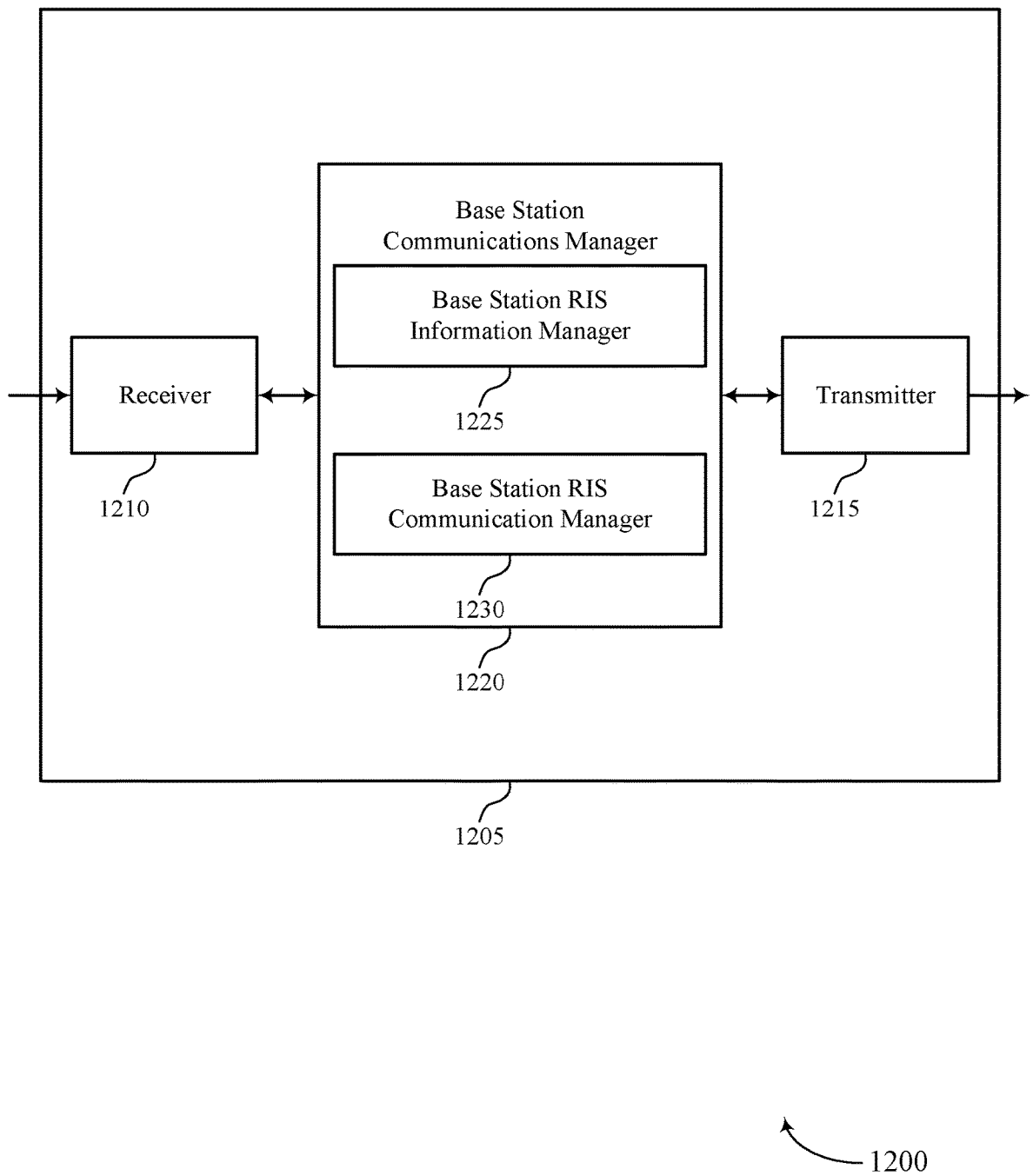

FIG. 12 shows a block diagram 1200 of a device 1205 that supports reconfigurable intelligent surface discovery procedure based on wireless sensing in accordance with aspects of the present disclosure. The device 1205 may be an example of aspects of a device 1105 or a base station 105 as described herein. The device 1205 may include a receiver 1210, a transmitter 1215, and a base station communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to RIS discovery procedure based on wireless sensing). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to RIS discovery procedure based on wireless sensing). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of RIS discovery procedure based on wireless sensing as described herein. For example, the base station communications manager 1220 may include a base station RIS information manager 1225, a base station RIS communication manager 1230, or any combination thereof. The base station communications manager 1220 may be an example of aspects of a base station communications manager 170 or a base station communications manager 1120 as described herein. In some examples, the base station communications manager 1220, or various components thereof, may be configured to perform various operations (e.g., receiving, monitoring, transmitting) using or otherwise in cooperation with the receiver 1210, the transmitter 1215, or both. For example, the base station communications manager 1220 may receive information from the receiver 1210, send information to the transmitter 1215, or be integrated in combination with the receiver 1210, the transmitter 1215, or both to receive information, transmit information, or perform various other operations as described herein.

The base station communications manager 1220 may support wireless communication at a base station in a wireless communications system in accordance with examples as disclosed herein. The base station RIS information manager 1225 may be configured as or otherwise support a means for determining information associated with one or more RISs in the wireless communications system. The base station RIS information manager 1225 may be configured as or otherwise support a means for transmitting, to a UE, the information associated with the one or more RISs. The base station RIS communication manager 1230 may be configured as or otherwise support a means for communicating with the UE via the one or more RISs based on the information associated with the one or more RISs.

Figure 13:
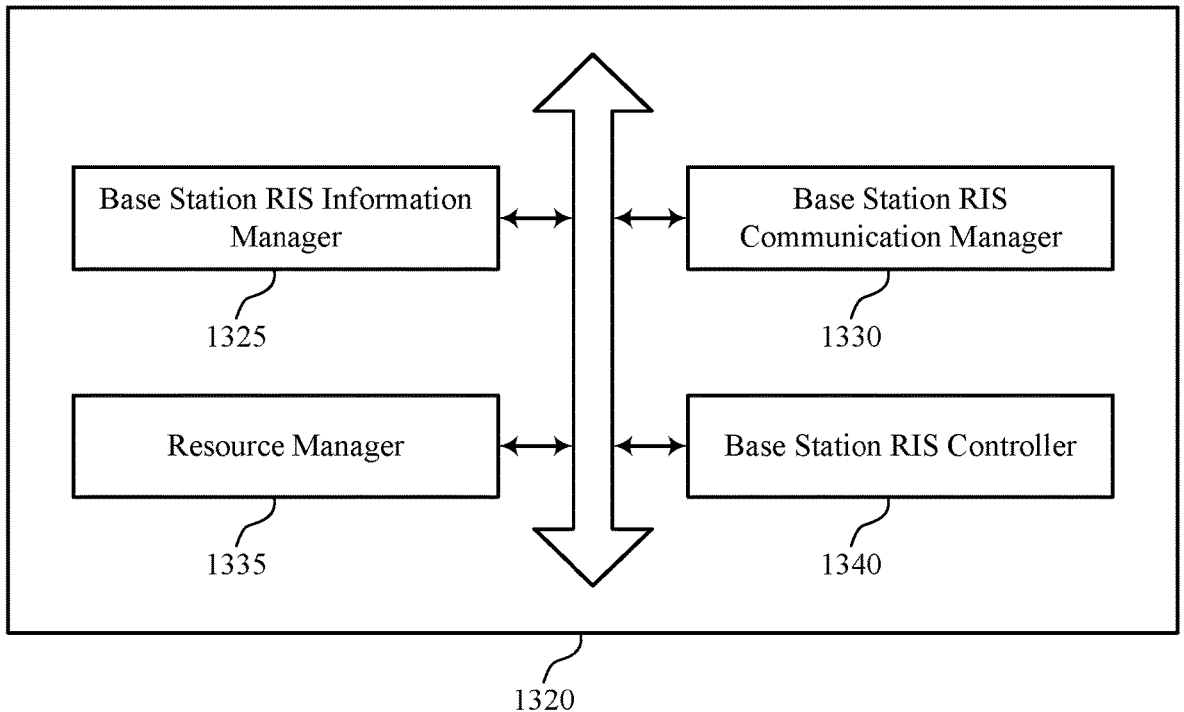
FIG. 13 shows a block diagram of a communications manager that supports reconfigurable intelligent surface discovery procedures in accordance with aspects of the present disclosure.

FIG. 13 shows a block diagram 1300 of a base station communications manager 1320 that supports reconfigurable intelligent surface discovery procedures in accordance with aspects of the present disclosure. The base station communications manager 1320 may be an example of aspects of a base station communications manager 170, a base station communications manager 1120, or a base station communications manager 1220, as described herein. The base station communications manager 1320, or various components thereof, may be an example of means for performing various aspects of reconfigurable intelligent surface discovery procedure based on wireless sensing as described herein. For example, the base station communications manager 1320 may include a base station RIS information manager 1325, a base station RIS communication manager 1330, a resource manager 1335, a base station RIS controller 1340, or any combination thereof. Each of these components may communicate, directly or indirectly, with one another (e.g., via one or more buses).

The base station communications manager 1320 may support wireless communication at a base station in a wireless communications system in accordance with examples as disclosed herein. The base station RIS information manager 1325 may be configured as or otherwise support a means for determining information associated with one or more RISs in the wireless communications system. In some examples, the base station RIS information manager 1325 may be configured as or otherwise support a means for transmitting, to a UE, the information associated with the one or more RISs. The base station RIS communication manager 1330 may be configured as or otherwise support a means for communicating with the UE via the one or more RISs based on the information associated with the one or more RISs.

In some examples, the base station RIS information manager 1325 may be configured as or otherwise support a means for receiving, from the UE, a request for the information associated with the one or more RISs, where transmitting the information associated with the one or more RISs is based on the request. In some examples, to support receiving the request, the base station RIS information manager 1325 may be configured as or otherwise support a means for receiving the request via a radio resource control signal, a MAC control element, a physical uplink control channel, or a physical random access channel.

In some examples, the resource manager 1335 may be configured as or otherwise support a means for transmitting an indication of resources to the UE for sensing the one or more RISs. In some examples, the resources may include one or more of time or frequency resources, a sensing signal waveform, and peer-to-peer communication resources.

In some examples, the base station RIS controller 1340 may be configured as or otherwise support a means for determining a delay period between a sensing signal and a control signal for the one or more RISs. In some examples, the base station RIS controller 1340 may be configured as or otherwise support a means for transmitting an indication of the delay period to the UE.

In some examples, to support transmitting the information associated with the one or more RISs, the base station RIS information manager 1325 may be configured as or otherwise support a means for transmitting the information associated with the one or more RISs via system information, a radio resource control signal, a MAC control element, or a physical downlink control channel.

In some examples, the information associated with the one or more RISs includes at least one of a number of the one or more RISs, an operating frequency of a first RIS of the one or more RISs, a location of the first RIS, a type of the first RIS, a control protocol of the first RIS, a pattern of state change of the first RIS, and a current state of the first RIS.

Figure 14:
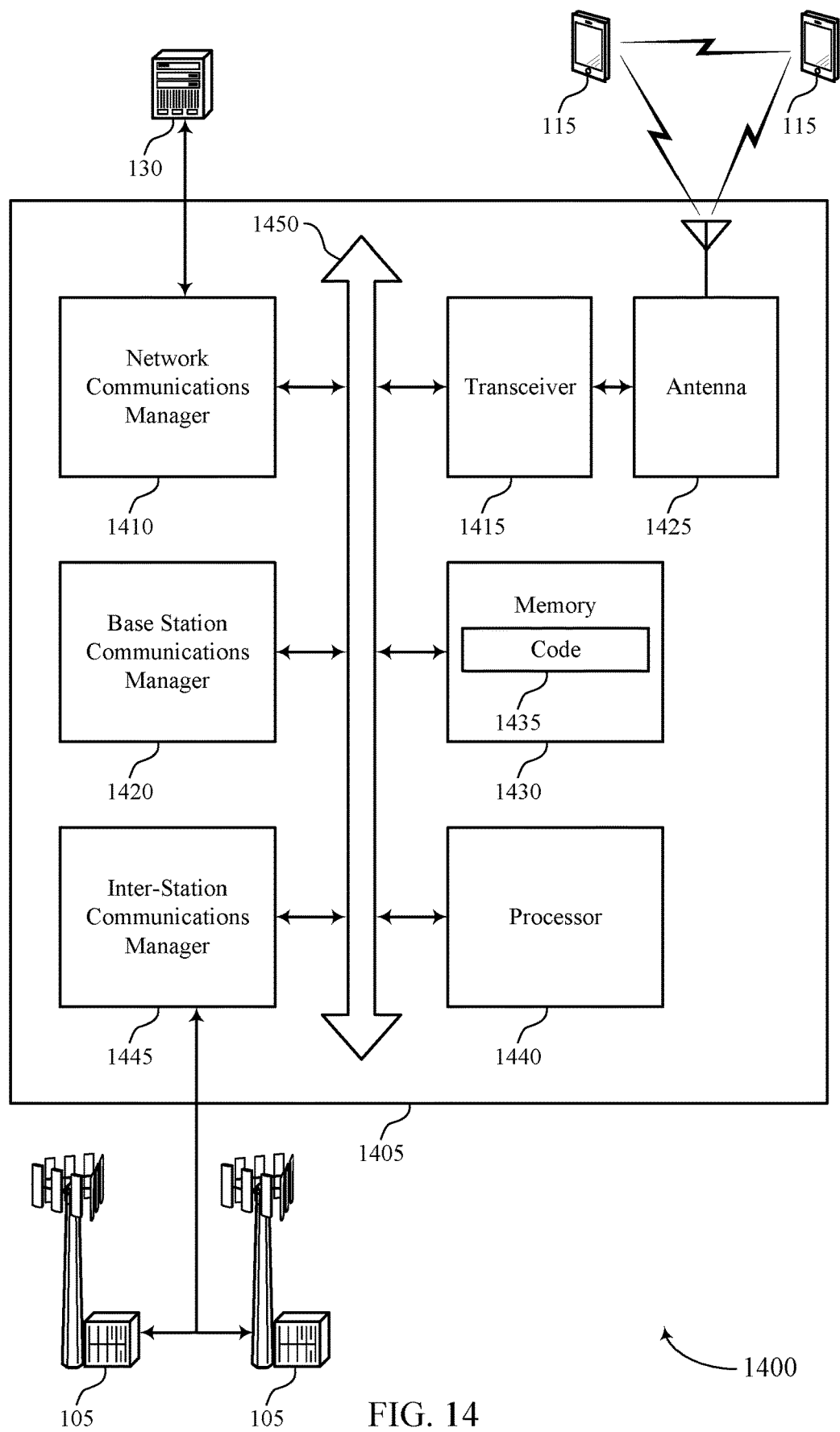
FIG. 14 shows a diagram of a system including a device that supports reconfigurable intelligent surface discovery procedures in accordance with aspects of the present disclosure.

FIG. 14 shows a diagram of a system 1400 including a device 1405 that supports reconfigurable intelligent surface discovery procedures in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a base station communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting RIS discovery procedure based on wireless sensing). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The base station communications manager 1420 may support wireless communication at a base station in a wireless communications system in accordance with examples as disclosed herein. For example, the base station communications manager 1420 may be configured as or otherwise support a means for determining information associated with one or more RISs in the wireless communications system. The base station communications manager 1420 may be configured as or otherwise support a means for transmitting, to a UE, the information associated with the one or more RISs. The base station communications manager 1420 may be configured as or otherwise support a means for communicating with the UE via the one or more RISs based on the information associated with the one or more RISs.

By including or configuring the base station communications manager 1420 in accordance with examples as described herein, the device 1405 may support techniques for improved communication reliability, reduced latency, improved user experience related to reduced processing, reduced power consumption, more efficient utilization of communication resources, improved coordination between devices, reduced interference, and longer battery life at the UE.

In some examples, the base station communications manager 1420 may be configured to perform various operations (e.g., receiving, monitoring, transmitting) using or otherwise in cooperation with the transceiver 1415, the one or more antennas 1425, or any combination thereof. Although the base station communications manager 1420 is illustrated as a separate component, in some examples, one or more functions described with reference to the base station communications manager 1420 may be supported by or performed by the processor 1440, the memory 1430, the code 1435, or any combination thereof. For example, the code 1435 may include instructions executable by the processor 1440 to cause the device 1405 to perform various aspects of RIS discovery procedure based on wireless sensing as described herein, or the processor 1440 and the memory 1430 may be otherwise configured to perform or support such operations.

Figure 15:
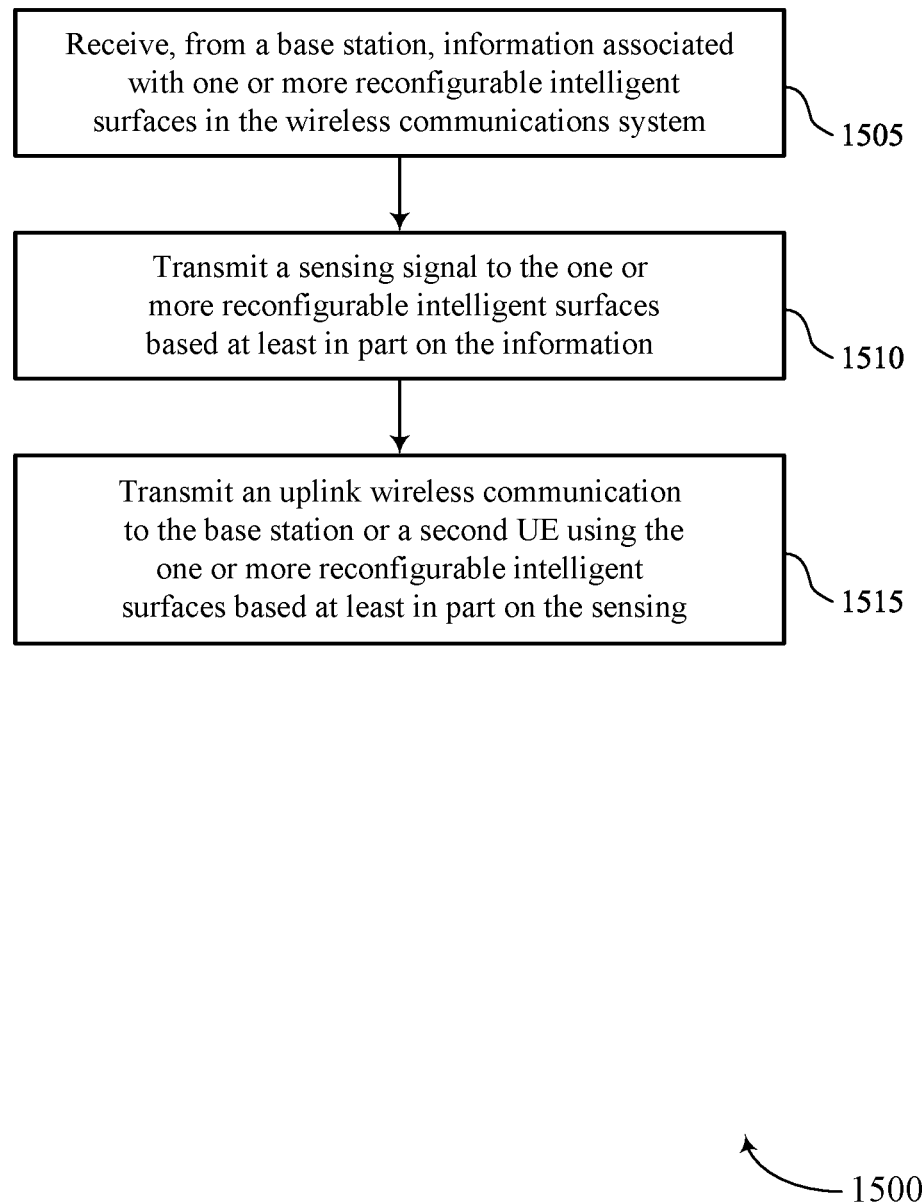
FIGS. 15 and 16 show flowcharts illustrating methods that support reconfigurable intelligent surface discovery procedures in accordance with aspects of the present disclosure.

FIG. 15 shows a flowchart illustrating a method 1500 that supports reconfigurable intelligent surface discovery procedures in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving, from a base station, information associated with one or more RISs in the wireless communications system. The operations of 1505 may be performed in accordance with examples as disclosed herein. In some examples, aspects of the operations of 1505 may be performed by a UE RIS information manager 925 as described with reference to FIG. 9.

At 1510, the method may include transmitting a sensing signal to the one or more RISs based on the information. The operations of 1510 may be performed in accordance with examples as disclosed herein. In some examples, aspects of the operations of 1510 may be performed by an RIS detector 930 as described with reference to FIG. 9.

At 1515, the method may include transmitting an uplink wireless communication to the base station or a second UE using the one or more RISs based on the sensing. The operations of 1515 may be performed in accordance with examples as disclosed herein. In some examples, aspects of the operations of 1515 may be performed by a UE RIS communication manager 935 as described with reference to FIG. 9.

Figure 16:
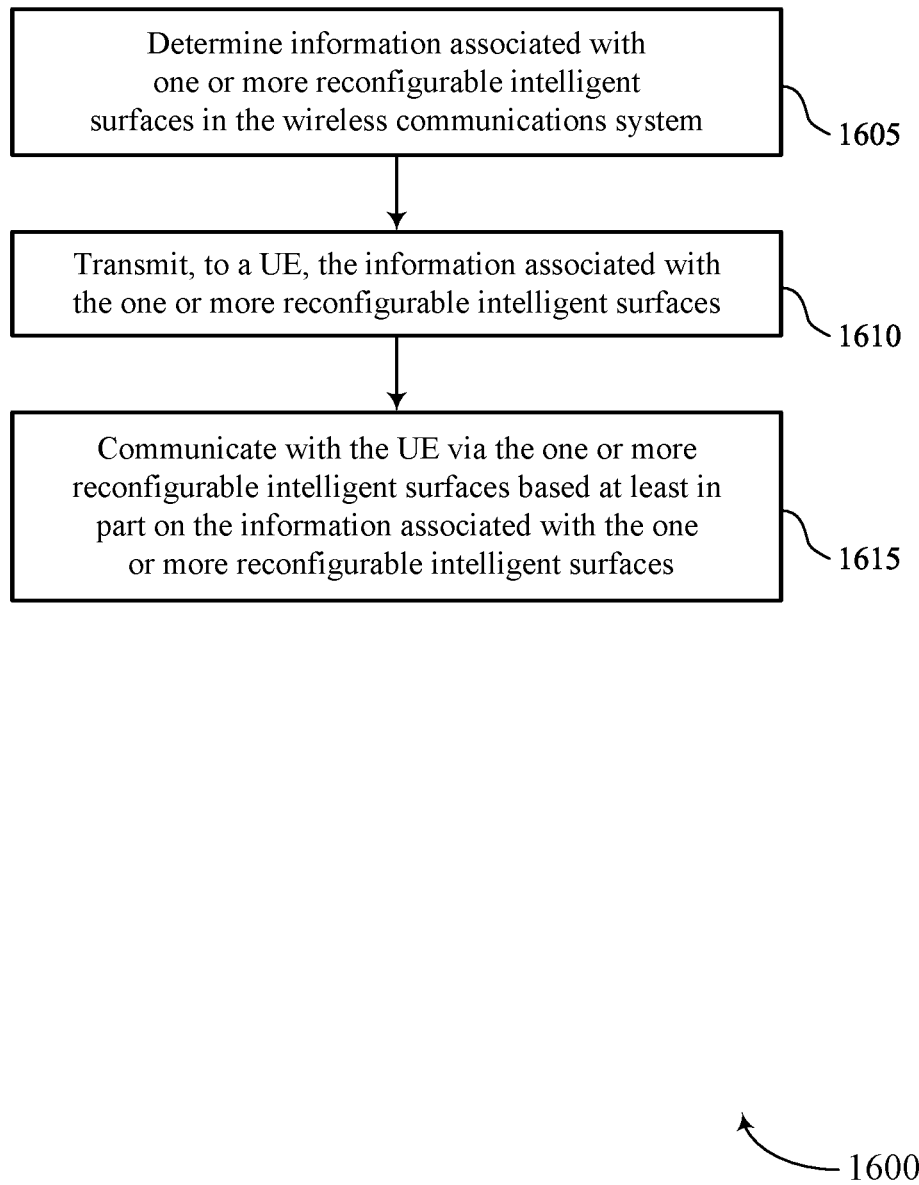

FIG. 16 shows a flowchart illustrating a method 1600 that supports reconfigurable intelligent surface discovery procedures in accordance with aspects of the present disclosure. The operations of the method 1600 may be implemented by a base station or its components as described herein. For example, the operations of the method 1600 may be performed by a base station 105 as described with reference to FIGS. 1 through 6 and 11 through 14. In some examples, a base station may execute a set of instructions to control the functional elements of the base station to perform the described functions. Additionally, or alternatively, the base station may perform aspects of the described functions using special-purpose hardware.

At 1605, the method may include determining information associated with one or more RISs in the wireless communications system. The operations of 1605 may be performed in accordance with examples as disclosed herein. In some examples, aspects of the operations of 1605 may be performed by a base station RIS information manager 1325 as described with reference to FIG. 13.

At 1610, the method may include transmitting, to a UE, the information associated with the one or more RISs. The operations of 1610 may be performed in accordance with examples as disclosed herein. In some examples, aspects of the operations of 1610 may be performed by a base station RIS information manager 1325 as described with reference to FIG. 13.

At 1615, the method may include communicating with the UE via the one or more RISs based on the information associated with the one or more RISs. The operations of 1615 may be performed in accordance with examples as disclosed herein. In some examples, aspects of the operations of 1615 may be performed by a base station RIS communication manager 1330 as described with reference to FIG. 13.

The following provides an overview of aspects of the present disclosure:

Aspect 1: A method for wireless communication at a first UE in a wireless communications system, comprising: receiving, from a base station, information associated with one or more RISs in the wireless communications system; transmitting a sensing signal to the one or more RISs based at least in part on the information; and transmitting an uplink wireless communication to the base station or a second UE using the one or more RISs based at least in part on the sensing.

Aspect 2: The method of aspect 1, further comprising: requesting, from the base station, the information associated with the one or more RISs, wherein receiving the information is based at least in part on the requesting.

Aspect 3: The method of aspect 2, wherein requesting the information further comprises: transmitting a request via a radio resource control signal, a MAC control element, a physical uplink control channel, or a physical random access channel.

Aspect 4: The method of any of aspects 1 through 3, wherein transmitting the sensing signal to the one or more RISs further comprises: sweeping the sensing signal over a directional range; and receiving a return signal related to the sensing signal that indicates a direction of a first RIS of the one or more RISs.

Aspect 5: The method of aspect 4, wherein the return signal related to the sensing signal comprises a reflection of the sensing signal off the first RIS.

Aspect 6: The method of any of aspects 4, wherein the return signal related to the sensing signal comprises a signal from the second UE based at least in part on the second UE detecting a reflection of the sensing signal from the first RIS.

Aspect 7: The method of any of aspects 1 through 6, further comprising: determining a property of the sensing signal based at least in part on the information associated with the one or more RISs.

Aspect 8: The method of any of aspects 1 through 7, further comprising: receiving one or more return signals related to the sensing signal that indicate a presence of a plurality of objects; and distinguishing the one or more RISs among the plurality of objects based at least in part on the information associated with the one or more RISs.

Aspect 9: The method of any of aspects 1 through 8, further comprising: receiving an indication of resources to use for the sensing signal.

Aspect 10: The method of aspect 9, wherein the resources may include one or more of time or frequency resources, a sensing signal waveform, and peer-to-peer communication resources.

Aspect 11: The method of any of aspects 1 through 10, further comprising: transmitting a RIS control message to the first RIS.

Aspect 12: The method of aspect 11, further comprising: determining that a type of a first RIS of the one or more RISs is a controllable RIS based at least in part on the information, wherein the RIS control message is based at least in part on the type of the first RIS.

Aspect 13: The method of any of aspects 11 through 12, wherein transmitting the sensing signal further comprises: transmitting the sensing signal to the first RIS at a first time after a delay period from a second time of transmitting the RIS control message.

Aspect 14: The method of aspect 13, further comprising: determining the delay period based at least in part on a configuration of the first UE or a configuration signal received at the first UE.

Aspect 15: The method of any of aspects 1 through 14, wherein the information associated with the one or more RISs comprises at least one of a number of the one or more RISs, an operating frequency of a first RIS of the one or more RISs, a location of the first RIS, a type of the first RIS, a control protocol of the first RIS, a pattern of state change of the first RIS, and a current state of the first RIS.

Aspect 16: A method for wireless communication at a base station in a wireless communications system, comprising: determining information associated with one or more RISs in the wireless communications system; transmitting, to a UE, the information associated with the one or more RISs; and communicating with the UE via the one or more RISs based at least in part on the information associated with the one or more RISs.

Aspect 17: The method of aspect 16, further comprising: receiving, from the UE, a request for the information associated with the one or more RISs, wherein transmitting the information associated with the one or more RISs is based at least in part on the request.

Aspect 18: The method of aspect 17, wherein receiving the request further comprises: receiving the request via a radio resource control signal, a MAC control element, a physical uplink control channel, or a physical random access channel.

Aspect 19: The method of any of aspects 16 through 18, further comprising: transmitting an indication of resources to the UE for sensing the one or more RISs.

Aspect 20: The method of aspect 19, wherein the resources may include one or more of time or frequency resources, a sensing signal waveform, and peer-to-peer communication resources.

Aspect 21: The method of any of aspects 16 through 20, further comprising: determining a delay period between a sensing signal and a control signal for the one or more RISs; and transmitting an indication of the delay period to the UE.

Aspect 22: The method of any of aspects 16 through 21, wherein transmitting the information associated with the one or more RISs further comprises: transmitting the information associated with the one or more RISs via system information, a radio resource control signal, a MAC control element, or a physical downlink control channel.

Aspect 23: The method of any of aspects 16 through 22, wherein the information associated with the one or more RISs comprises at least one of a number of the one or more RISs, an operating frequency of a first RIS of the one or more RISs, a location of the first RIS, a type of the first RIS, a control protocol of the first RIS, a pattern of state change of the first RIS, and a current state of the first RIS.

Aspect 24: An apparatus for wireless communication at a first UE in a wireless communications system, comprising a processor; memory coupled with the processor; and instructions stored in the memory and executable by the processor to cause the apparatus to perform a method of any of aspects 1 through 15.

Aspect 25: An apparatus for wireless communication at a first UE in a wireless communications system, comprising at least one means for performing a method of any of aspects 1 through 15.

Aspect 26: A non-transitory computer-readable medium storing code for wireless communication at a first UE in a wireless communications system, the code comprising instructions executable by a processor to perform a method of any of aspects 1 through 15.

Aspect 27: An apparatus for wireless communication at a base station in a wireless communications system, comprising a processor; memory coupled with the processor; and instructions stored in the memory and executable by the processor to cause the apparatus to perform a method of any of aspects 16 through 23.

Aspect 28: An apparatus for wireless communication at a base station in a wireless communications system, comprising at least one means for performing a method of any of aspects 16 through 23.

Aspect 29: A non-transitory computer-readable medium storing code for wireless communication at a base station in a wireless communications system, the code comprising instructions executable by a processor to perform a method of any of aspects 16 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE) in a wireless communications system, comprising:

transmitting, to an access network entity, a request for information associated with one or more reconfigurable intelligent surfaces in the wireless communications system via a radio resource control signal, a media access control (MAC) control element, a physical uplink control channel, or a physical random access channel;

receiving, from the access network entity, the information associated with the one or more reconfigurable intelligent surfaces, wherein receiving the information is based at least in part on the request;

transmitting a sensing signal to the one or more reconfigurable intelligent surfaces based at least in part on the information; and transmitting an uplink wireless communication to the access network entity or a second UE using the one or more reconfigurable intelligent surfaces based at least in part on the sensing signal.

2. The method of claim 1, wherein transmitting the sensing signal to the one or more reconfigurable intelligent surfaces further comprises:

sweeping the sensing signal over a directional range; and receiving a return signal related to the sensing signal that indicates a direction of a first reconfigurable intelligent surface of the one or more reconfigurable intelligent surfaces.

3. The method of claim 2, wherein the return signal related to the sensing signal comprises a reflection of the sensing signal off the first reconfigurable intelligent surface.

4. The method of claim 2, wherein the return signal related to the sensing signal comprises a signal from the second UE based at least in part on the second UE detecting a reflection of the sensing signal from the first reconfigurable intelligent surface.

5. The method of claim 1, further comprising:

determining a property of the sensing signal based at least in part on the information associated with the one or more reconfigurable intelligent surfaces.

6. The method of claim 1, further comprising:

receiving one or more return signals related to the sensing signal that indicate a presence of a plurality of objects; and distinguishing the one or more reconfigurable intelligent surfaces among the plurality of objects based at least in part on the information associated with the one or more reconfigurable intelligent surfaces.

7. The method of claim 1, further comprising:

receiving an indication of resources to use for the sensing signal.

8. The method of claim 7, wherein the resources may include one or more of time or frequency resources, a sensing signal waveform, and peer-to-peer communication resources.

9. The method of claim 1, further comprising:

transmitting a reconfigurable intelligent surface control message to a first reconfigurable intelligent surface of the one or more reconfigurable intelligent surfaces.

10. The method of claim 9, further comprising:

determining that a type of the first reconfigurable intelligent surface of the one or more reconfigurable intelligent surfaces is a controllable reconfigurable intelligent surface based at least in part on the information, wherein the reconfigurable intelligent surface control message is based at least in part on the type of the first reconfigurable intelligent surface.

11. The method of claim 9, wherein transmitting the sensing signal further comprises:

transmitting the sensing signal to the first reconfigurable intelligent surface at a first time after a delay period from a second time of transmitting the reconfigurable intelligent surface control message.

12. The method of claim 11, further comprising:
determining the delay period based at least in part on a configuration of the first UE or a configuration signal received at the first UE.

13. The method of claim 1, wherein the information associated with the one or more reconfigurable intelligent surfaces comprises at least one of a number of the one or more reconfigurable intelligent surfaces, an operating frequency of a first reconfigurable intelligent surface of the one or more reconfigurable intelligent surfaces, a location of the first reconfigurable intelligent surface, a type of the first reconfigurable intelligent surface, a control protocol of the first reconfigurable intelligent surface, a pattern of state change of the first reconfigurable intelligent surface, and a current state of the first reconfigurable intelligent surface.

14. A method for wireless communication at an access network entity in a wireless communications system, comprising:
receiving, from a user equipment (UE), a request for information associated with one or more reconfigurable intelligent surfaces in the wireless communications system via a radio resource control signal, a media access control (MAC) control element, a physical uplink control channel, or a physical random access channel;
determining the information associated with the one or more reconfigurable intelligent surfaces;
transmitting, to the UE, the information associated with the one or more reconfigurable intelligent surfaces based at least in part on the request; and
communicating with the UE via the one or more reconfigurable intelligent surfaces based at least in part on the information associated with the one or more reconfigurable intelligent surfaces.

15. The method of claim 14, further comprising:
transmitting an indication of resources to the UE for sensing the one or more reconfigurable intelligent surfaces.

16. The method of claim 15, wherein the resources may include one or more of time or frequency resources, a sensing signal waveform, and peer-to-peer communication resources.

17. The method of claim 14, further comprising:
determining a delay period between a sensing signal and a control signal for the one or more reconfigurable intelligent surfaces; and
transmitting an indication of the delay period to the UE.

18. The method of claim 14, wherein transmitting the information associated with the one or more reconfigurable intelligent surfaces further comprises:
transmitting the information associated with the one or more reconfigurable intelligent surfaces via system information, a radio resource control signal, a media access control (MAC) control element, or a physical downlink control channel.

19. The method of claim 14, wherein the information associated with the one or more reconfigurable intelligent surfaces comprises at least one of a number of the one or more reconfigurable intelligent surfaces, an operating frequency of a first reconfigurable intelligent surface of the one or more reconfigurable intelligent surfaces, a location of the first reconfigurable intelligent surface, a type of the first reconfigurable intelligent surface, a control protocol of the first reconfigurable intelligent surface, a pattern of state change of the first reconfigurable intelligent surface, and a current state of the first reconfigurable intelligent surface.

20. An apparatus for wireless communication at a first user equipment (UE) in a wireless communications system, comprising:
a processor;
memory coupled with the processor; and
instructions stored in the memory and executable by the processor to cause the apparatus to:
transmit, to an access network entity, a request for information associated with one or more reconfigurable intelligent surfaces in the wireless communications system via a radio resource control signal, a media access control (MAC) control element, a physical uplink control channel, or a physical random access channel;
receive, from the access network entity, the information associated with the one or more reconfigurable intelligent surfaces, wherein receiving the information is based at least in part on the request;
transmit a sensing signal to the one or more reconfigurable intelligent surfaces based at least in part on the information; and
transmit an uplink wireless communication to the access network entity or a second UE using the one or more reconfigurable intelligent surfaces based at least in part on the sensing signal.

21. The apparatus of claim 20, wherein the instructions are further executable by the processor to cause the apparatus to:
request, from the access network entity, the information associated with the one or more reconfigurable intelligent surfaces, wherein receiving the information is based at least in part on the request.

22. The apparatus of claim 20, wherein the instructions to transmit the sensing signal to the one or more reconfigurable intelligent surfaces are further executable by the processor to cause the apparatus to:
sweep the sensing signal over a directional range; and
receive a return signal related to the sensing signal that indicates a direction of a first reconfigurable intelligent surface of the one or more reconfigurable intelligent surfaces.

23. The apparatus of claim 20, wherein the instructions are further executable by the processor to cause the apparatus to:
receive one or more return signals related to the sensing signal that indicate a presence of a plurality of objects; and
distinguish the one or more reconfigurable intelligent surfaces among the plurality of objects based at least in part on the information associated with the one or more reconfigurable intelligent surfaces.

24. The apparatus of claim 20, wherein the instructions are further executable by the processor to cause the apparatus to:
transmit a reconfigurable intelligent surface control message to a first reconfigurable intelligent surface of the one or more reconfigurable intelligent surfaces.

25. An apparatus for wireless communication at an access network entity in a wireless communications system, comprising:
a processor;
memory coupled with the processor; and
instructions stored in the memory and executable by the processor to cause the apparatus to:

receive, from a user equipment (UE), a request for information associated with one or more reconfigurable intelligent surfaces in the wireless communications system via a radio resource control signal, a media access control (MAC) control element, a physical uplink control channel, or a physical random access channel;

determine the information associated with the one or more reconfigurable intelligent surfaces;

transmit, to the UE, the information associated with the one or more reconfigurable intelligent surfaces based at least in part on the request; and communicate with the UE via the one or more reconfigurable intelligent surfaces based at least in part on the information associated with the one or more reconfigurable intelligent surfaces.

26. An apparatus for wireless communication at a first user equipment (UE) in a wireless communications system, comprising:

a processor;

memory coupled with the processor; and instructions stored in the memory and executable by the processor to cause the apparatus to:

receive, from an access network entity, information associated with one or more reconfigurable intelligent surfaces in the wireless communications system;

transmit a sensing signal to the one or more reconfigurable intelligent surfaces based at least in part on the information, wherein transmitting the sensing signal further comprises sweeping the sensing signal over a directional range;

receive a return signal related to the sensing signal that indicates a direction of a first reconfigurable intelligent surface of the one or more reconfigurable intelligent surfaces; and transmit an uplink wireless communication to the access network entity or a second UE using the one or more reconfigurable intelligent surfaces based at least in part on the sensing signal.

27. An apparatus for wireless communication at a first user equipment (UE) in a wireless communications system, comprising:

a processor;

memory coupled with the processor; and instructions stored in the memory and executable by the processor to cause the apparatus to:

receive, from an access network entity, information associated with one or more reconfigurable intelligent surfaces in the wireless communications system;

transmit a sensing signal to the one or more reconfigurable intelligent surfaces based at least in part on the information;

transmit an uplink wireless communication to the access network entity or a second UE using the one or more reconfigurable intelligent surfaces based at least in part on the sensing signal; and transmit a reconfigurable intelligent surface control message to a first reconfigurable intelligent surface of the one or more reconfigurable intelligent surfaces.

* * * * *